(12) United States Patent
Khan

(10) Patent No.: US 11,444,334 B1
(45) Date of Patent: Sep. 13, 2022

(54) NICKEL OXIDE (NIO) NANO-SHEETS BASED ELECTROCHROMIC ENERGY STORAGE DEVICE

(71) Applicant: KING FAHD UNIVERSITY OF PETROLEUM AND MINERALS, Dhahran (SA)

(72) Inventor: Firoz Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/736,127

(22) Filed: May 4, 2022

(51) Int. Cl.
| | |
|---|---|
| *H01M 10/30* | (2006.01) |
| *G02F 1/1524* | (2019.01) |
| *H01M 10/28* | (2006.01) |
| *H01M 4/32* | (2006.01) |
| *H01M 4/52* | (2010.01) |
| *G02F 1/155* | (2006.01) |
| *C23C 18/32* | (2006.01) |
| *G02F 1/1523* | (2019.01) |

(52) U.S. Cl.
CPC ............. *H01M 10/30* (2013.01); *C23C 18/32* (2013.01); *G02F 1/1524* (2019.01); *H01M 4/32* (2013.01); *H01M 4/52* (2013.01); *H01M 10/28* (2013.01); *G02F 1/155* (2013.01); *G02F 1/1525* (2013.01); *G02F 2202/36* (2013.01); *H01M 2300/00* (2013.01); *H01M 2300/002* (2013.01); *H01M 2300/0014* (2013.01)

(58) Field of Classification Search
CPC .......... H01M 10/30; H01M 4/32; H01M 4/52; H01M 10/28; G02F 1/1524; G02F 1/155
See application file for complete search history.

(56) References Cited

U.S. PATENT DOCUMENTS

| | | | |
|---|---|---|---|
| 10,236,135 B2 * | 3/2019 | Tour .................... | H01M 4/0471 |
| 10,732,476 B2 | 8/2020 | Bulja et al. | |
| 11,091,390 B2 | 8/2021 | Wang et al. | |
| 2016/0276649 A1 * | 9/2016 | Turney .................... | H01M 4/52 |

FOREIGN PATENT DOCUMENTS

| | | |
|---|---|---|
| CN | 113433756 A | 9/2021 |
| KR | 10-2052440 B1 | 12/2019 |

OTHER PUBLICATIONS

Hongliang Zhang, et al., "Aluminum-ion-intercalation nickel oxide thin films for high-performance electrochromic energy storage devices", Journal of Materials Chemistry C, vol. 9, Issue 48, Nov. 12, 2021, pp. 17427-17436 (Abstract only).

(Continued)

*Primary Examiner* — Stewart A Fraser
(74) *Attorney, Agent, or Firm* — Oblon, McClelland, Maier & Neustadt, L.L.P.

(57) ABSTRACT

An electrochromic energy storage device is described. An electrochromic energy storage device includes a first substrate, a second substrate, an electrolyte present between the first substrate and the second substrate. The device further includes nickel oxide (NiO) nano-sheets that at least partially cover a first side of the first substrate. Further, the NiO nano-sheets are comprised of interconnected nanoflakes, where the nanoflakes have a width of 5-29 nanometers (nm). A method of preparing the NiO nano-sheets is also described.

18 Claims, 18 Drawing Sheets

(56) References Cited

OTHER PUBLICATIONS

Krystallia Theodosiou, et al., "Quasi-Solid-State Electrochromic Cells with Energy Storage Properties Made with Inkjet Printing", Materials, vol. 13, No. 3241, Jul. 21, 2020, pp. 1-17.
Zhihui Luo, et al., "Revealing the Charge Storage Mechanism of Nickel Oxide Electrochromic Supercapacitors", ACS Applied Materials & Interfaces, vol. 12, No. 35, Aug. 3, 2020, pp. 39098-39107 (Abstract only).

\* cited by examiner

NICKEL OXIDE (NIO) NANO-SHEETS BASED ELECTROCHROMIC ENERGY STORAGE DEVICE

STATEMENT OF PRIOR DISCLOSURE BY THE INVENTOR

Aspects of the present disclosure are described in F. Khan; "Attaining remarkable switching speed of nickel oxide-based electrode for electrochromic energy storage devices"; Feb. 12, 2022; Surfaces and Interfaces, 29, 101792, incorporated herein by reference in its entirety.

BACKGROUND

Technical Field

The present disclosure is directed to energy storage devices, and particularly to a nickel oxide (NiO) nano-sheets-based electrochromic energy storage device.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Owing to an increased population and elevated living standards of modern society, energy demand is escalating. Conventionally used sustainable and renewable resources, such as solar, wind, are unstable and irregular owing to the unavailability of solar energy during the night or cloudy weather. Therefore, renewable energy sources may be proficiently deployed along with energy storage devices (ESDs).

Supercapacitors (SCs) and batteries are believed to be extremely promising ESDs for their application in electric vehicles (EVs), electric hybrid vehicles (EHVs), and renewable energy systems (RESs). Some of the electrode materials alter their colors during the charging and discharging process, which is known as electrochromism. SCs offer a fast charging/discharging rate and high power density, however, their high fabrication cost limits applications. Although, merging electrochromic (EC) with ESD (EC-ESD), maybe a cost-effective method, the EC-ESDs suffer from insignificant coloration efficiency (CE), sluggish switching speed, and soft chromatic contracts. Conventionally, NiO-based EC-ESDs have been used, however, they typically offer a slow switching speed (coloration/bleach) due to the NiO layer's low conductivity, which is a result of the slow intercalation/de-intercalation process. Thus, there is an unmet need to enhance the switching speed along with the performance of NiO-based EC-ESDs.

SUMMARY

In an exemplary embodiment, an electrochromic energy storage device is described. The electrochromic energy storage device includes a first substrate, a second substrate, an electrolyte present between the first substrate and the second substrate, and nickel oxide (NiO) nano-sheets. The NiO nano-sheets at least partially cover a first side of the first substrate and have a porous structure. The NiO nano-sheets are comprised of interconnected NiO nanoflakes, where the nanoflakes have a width of 5-29 nanometers (nm).

In some embodiments, the NiO nano-sheets have a Brunauer-Emmett-Teller (BET) surface area of 300-350 square meters per gram ($m^2/g$).

In some embodiments, the NiO nano-sheets have an average pore size of 70-90 nm.

In some embodiments, the device has an average thickness of 100 to 2,000 nm of the NiO nano-sheets on the first side of the first substrate.

In some embodiments, the device has a surface roughness of 500-1,000 nm.

In some embodiments, the first substrate is selected from a group consisting of indium tin oxide glass, fluorine-doped tin oxide (FTO) glass, and aluminum-doped zinc oxide glass.

In some embodiments, the second substrate is a metallic foil.

In some embodiments, the electrolyte is selected from the group consisting of an alkali metal hydroxide, an alkaline earth hydroxide, an alkali metal salt, and an alkaline earth salt.

In some embodiments, the device has an areal capacitance of 100-140 millifarad per squares centimeter (mF/cm2) at a scan rate of 5-10 millivolt per second (mV/s).

In some embodiments, at least 90% of the areal capacitance is maintained by the device after 1,000 charge-discharge cycles.

In some embodiments, the device has a series resistance of 1.5-1.75 ohm ($\Omega$).

In some embodiments, the device has a charge transfer resistance of 80-90$\Omega$.

In some embodiments, the device has an optical modulation of 60-72%.

In some embodiments, the device has a coloration efficiency of 45-55 $cm^2/C$.

In some embodiments, the device has a switching response time for coloration of 0.5-1 seconds.

In some embodiments, the device has the switching response time for bleaching of 0.1-0.5 seconds.

In some embodiments, the device has the NiO nano-sheets on the first side of the first substrate which is made by a method including mixing a nickel (II) salt, urea, and a fluoride salt in water and stirring for at least 30 minutes to form a mixture. The method further includes at least partially submerging the first substrate in the mixture and heating to 80-120° C. for 2-10 hours to form a NiO substrate. Further, the NiO substrate is washed with water and dried to form a dried substrate. Furthermore, the method includes heating the dried substrate to 200-400° C. for 1-5 hours under argon (Ar) to form NiO nano-sheets on the first side of the first substrate.

In some embodiments, the first substrate is made by submerging a substrate in a solution of 60-80 v % sulfuric acid and 20-40 v % hydrogen peroxide-based on the total volume of the sulfuric acid and hydrogen peroxide, for at least ten minutes to form a piranha cleaned substrate, and further washing the piranha cleaned substrate with de-ionized water to form a washed substrate and exposing the washed substrate to ozone for at least 10 minutes to form the first substrate.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
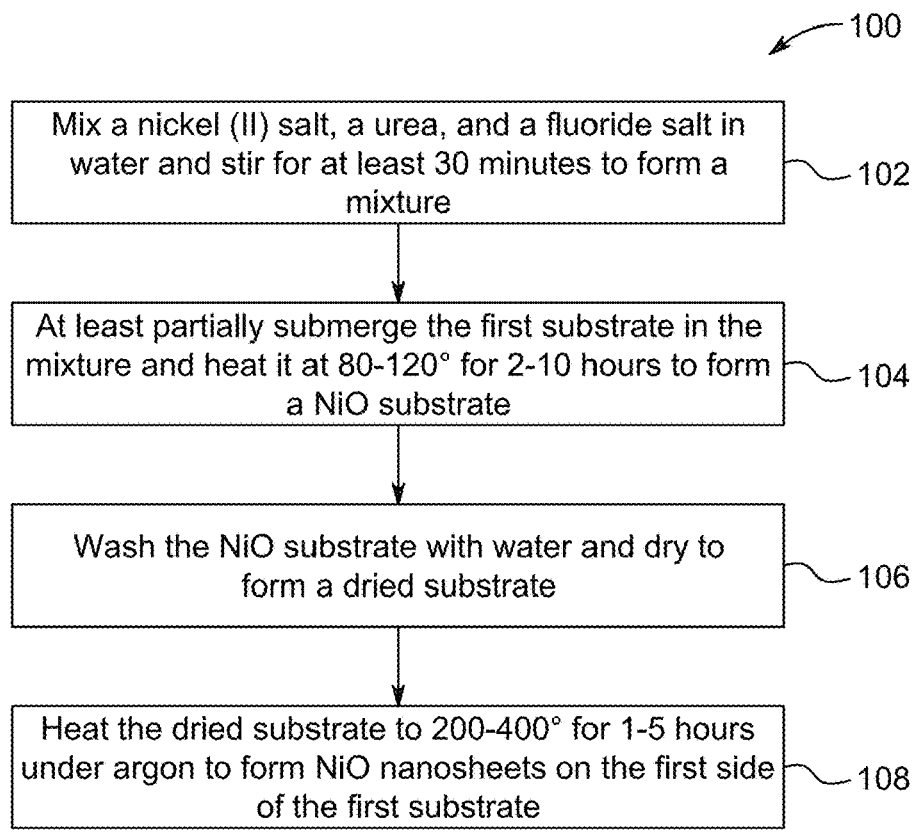
FIG. 1 is a schematic flow diagram of a method of the nickel oxide (NiO) nano-sheets (NSs) on a first side of a first substrate, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the term "electrochromism" refers to a phenomenon where the color or opacity of material changes when a voltage is applied.

As used herein, the term "nano-sheets" refers to a two-dimensional nanostructure with a thickness on a scale ranging from 1 to 1,000 nm.

As used herein, the term "nanoflakes" refers to a plate-like form or structure with at least one nanometric dimension.

Embodiments of the present disclosure are directed to an NiO nano-sheets based electrochromic energy storage device (EC-ESD). The electrochromic energy storage device includes fluorine-doped tin oxide (FTO) glass whose hydrophilicity was improved through piranha cleaning followed by ozone treatment. Highly porous NiO nano-sheets (NSs) were grown on the hydrophilic surface of the FTO glass by a hydrothermal process. An excellent interface between FTO and NiO NSs layer was created, thereby resulting in low charge transfer resistance. Hence, the switching speeds for the coloration/bleach of the NiO-electrode are greatly reduced and thus, a high-performance and stable NiO-based EC-ESD electrode is developed.

In an exemplary embodiment, the electrochromic energy storage device includes a first substrate, a second substrate, an electrolyte present between the first substrate and the second substrate, and nickel oxide (NiO) nano-sheets (NSs). The NiO nano-sheets at least partially cover a first side of the first substrate and are comprised of interconnected NiO nanoflakes. In some embodiments, the nanoflakes form a porous interconnected NiO NSs network. In some embodiments, the nanoflakes have a width of 5-29 nanometers (nm), preferably 7-25 nm, or 10-20 nm.

Figure 4A:
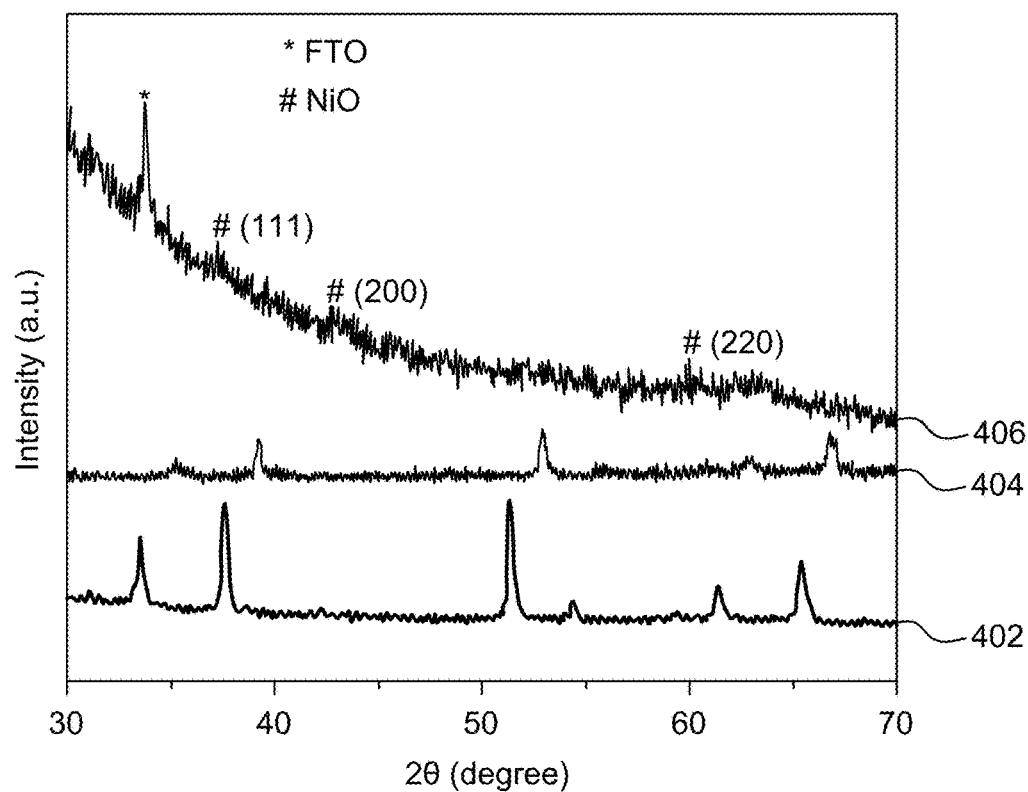
FIG. 4A illustrates an X-ray powder diffraction (XRD) pattern of fluorine-doped tin oxide (FTO), and unannealed/annealed FTO/NiO NSs layer, according to certain embodiments.
Figure 4B:
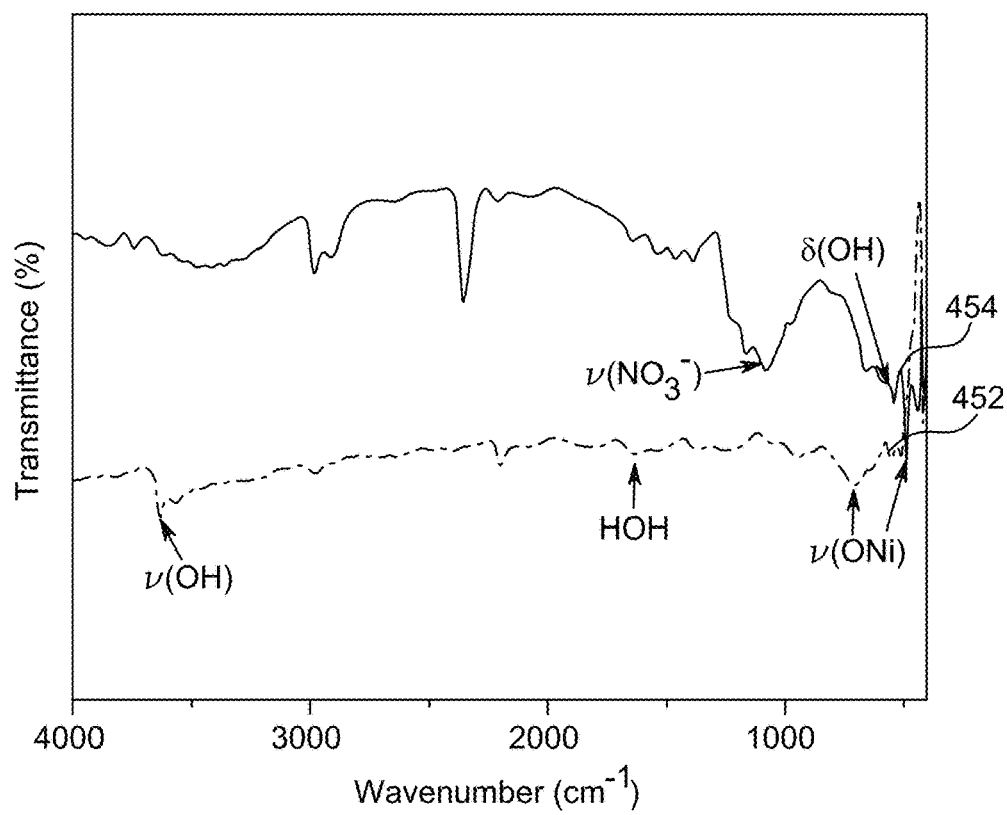
FIG. 4B illustrates a Fourier-transform infrared (FT-IR) spectra of the NiO NSs layer and an annealed NiO NSs layer, according to certain embodiments.

In some embodiments, as depicted in FIG. 4A, the NiO NSs have low crystallinity. In an embodiment, the ratio of crystalline to amorphous phases in the NiO NSs is 9:1, preferably 8:2, 7:3, 3:2, 1:1, 2:3, 3:7, 8:2, or 1:9. In some embodiments, the NiO NSs are 100% amorphous. In some embodiments, the NiO NSs are 100% crystalline. In some embodiments, the NiO NSs have a triclinic, monoclinic, orthorhombic, tetragonal, hexagonal or cubic crystal structure. In a preferred embodiment, the NiO has a cubic crystal structure. In an embodiment, the XRD pattern of the NiO NSs displays the (111) peak at 36-39°, preferably 36.5-38°, or 37-37.5°, the (200) peak at 42-45°, preferably 42.5-44°, or 43-43.5°, and the (220) peak at 61-64°, preferably 61.5-63.5°, or 62.5-63°. In an embodiment, the average crystallite size is 1-5 nm, preferably 2-4 nm, or approximately 2.5 nm. In an embodiment, the FT-IR displays a stretching vibration band of NiO at 400-500 cm$^{-1}$, preferably 425-475 cm$^{-1}$, or 460-470 cm$^{-1}$, a vibrational band of OH at 500-550 cm$^{-1}$, preferably 510-540 cm$^{-1}$, or 520-530 cm$^{-1}$, and a vibrational band of $NO_3^-$ 1000-1100 cm$^-$, preferably 1020-1080 cm$^{-1}$, or 1050-1070 cm$^{-1}$.

In some embodiments, the elements Ni and O are only present in the NiO NSs. In some embodiments, an impurity, such as sulfur, nitrogen, or carbon, is present in the NiO. In some embodiments, the Ni and O are homogenously distributed throughout the NiO NSs. In some embodiments, the NiO nano-sheets are vertically aligned on the substrate. In some embodiments, the device has a surface roughness of 500-1,000 nm, preferably 600-900 nm, or 700-800 nm. In some embodiments, higher surface roughness improves contact area with the electrolyte, thereby improving performance. In some embodiments, the NiO NSs have a Brunauer-Emmett-Teller (BET) surface area of 300-350 square meters per gram (m$^2$/g), preferably 315-350 m$^2$/g, or 325-350 m$^2$/g. In some embodiments, the NiO NSs have average pore size of, 50-150 nm, preferably 60-100 nm, or 70-90 nm. In some embodiments, the electrochromic energy storage device has an average thickness of 100 to 2,000 nm, preferably 500-1,500 nm, or 800-1,200 nm, of the NiO nano-sheets on a first side of the first substrate. In an embodiment, the NiO nano-sheets at least partially cover a first side of the first substrate such that the NiO nano-sheets cover at least 75% of the first side, preferably 80%, or 90%, of the first side. In a preferred embodiment, the NiO nano-sheets completely cover the first side of the first substrate.

In some embodiments, the first substrate is selected from the group consisting of indium tin oxide glass, fluorine-doped tin oxide (FTO) glass, and aluminum-doped zinc oxide glass. In a preferred embodiment, the first substrate is FTO. In some embodiments, the second substrate is a metallic foil. In some embodiments, the metallic foil is made from a group consisting of platinum, aluminum, nickel, tin, copper, and zinc. In an embodiment, the second substrate is a platinum foil.

In some embodiments, the electrolyte is selected from the group consisting of an alkali metal hydroxide, an alkaline earth hydroxide, an alkali metal salt, and an alkaline earth salt. In a preferred embodiment, the electrolyte is potassium hydroxide. In some embodiments, the electrolyte is dissolved in water and has a molarity of 1-10 M, preferably 3-8 M, or 5-6 M.

Referring to FIG. 1, a schematic flow diagram of the method 100 of preparing the NiO nano-sheets on the first side of the first substrate is illustrated. The method 100 described is to be read in conjunction with a synthesis of NiO nano-sheets as illustrated in the FIG. 3. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes mixing a nickel (II) salt, urea, and fluoride salt in water and stirring for at least 30 minutes, preferably 30-120 mins, or approximately 60 mins, to form a mixture. In some embodiments, the nickel (II) salt is selected from the group consisting of nickel nitrate, nickel chloride, nickel sulfate, nickel carbonate, and hydrates thereof. In some embodiments, the nickel (II) salt is nickel nitrate hexahydrate [$Ni(NO_3)_2.6H_2O$]. In some embodiments, the fluoride salt is ammonium fluoride, sodium fluoride, potassium fluoride, and hydrates thereof. In some embodiments, the fluoride salt is ammonium fluoride ($NH_4F$). In some embodiments, the nickel nitrate hexahydrate [$Ni(NO_3)_2.6H_2O$], urea [$CO(NH_2)_2$], and ammonium fluoride ($NH_4F$) were dissolved in de-ionized (DI) water and is stirred for 1 hour at 450 revolutions per minute (rpm) to form the mixture.

At step 104, the method 100 includes at least partially submerging the first substrate in the mixture and heating it at 80-120 degrees centigrade (° C.), preferably 90-110, or approximately 100° C. for 2-10 hours, preferably 3-8 hours, or 5-6 hours to form a NiO substrate. In some embodiments, the first substrate that was at least partially submerged in the mixture was heated at 100° C. for 5 hours to form the NiO substrate. In some embodiments, the first substrate is 80% submerged in the mixture, preferably 90%, or 100%. In an embodiment, the substrate is vertically submerged in the mixture.

At step 106, the method 100 includes washing the NiO substrate with water and drying it to form a dried substrate. In some embodiments, the samples were washed in DI water followed by air drying to form the dried substrate.

At step 108, the method 100 includes heating the dried substrate to 200-400° C. for 1-5 hours under argon (Ar) to form NiO nano-sheets on the first side of the first substrate. In some embodiments, the samples were annealed at 300° C. for 90 min in an Ar ambient atmosphere to form the NiO nano-sheets on the first side of the first substrate.

Figure 2:
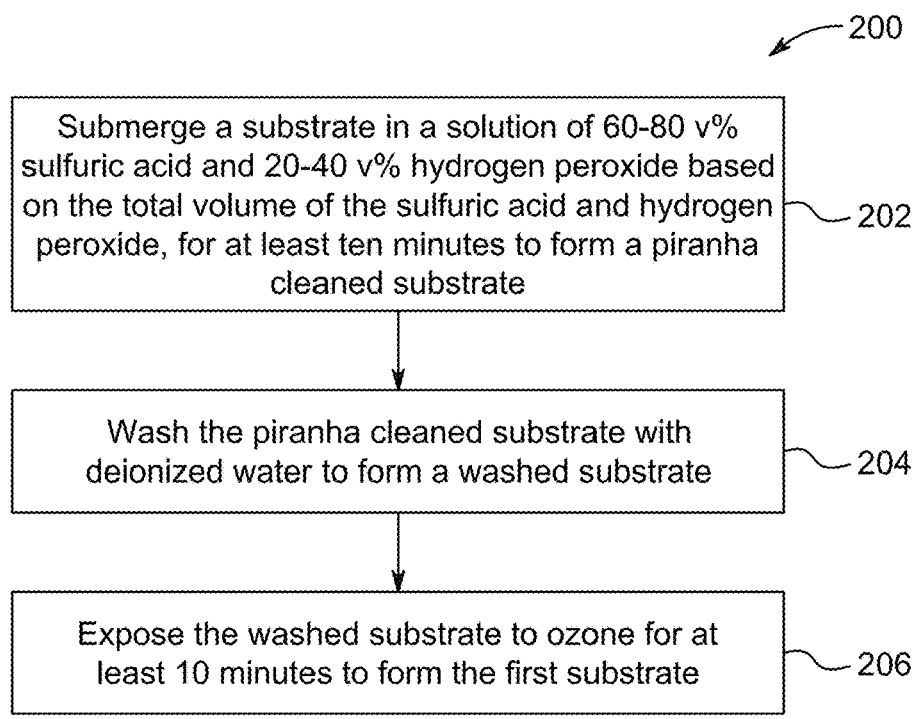
FIG. 2 is a schematic flow diagram of a method of preparing the first substrate, according to certain embodiments.

Referring to FIG. 2, a schematic flow diagram of the method 200 of preparing the first substrate is illustrated. The order in which the method 200 is described is not intended to be construed as a limitation, and any number of the described method steps may be combined in any order to implement the method 200. Additionally, individual steps may be removed or skipped from the method 200 without departing from the spirit and scope of the present disclosure.

At step 202, the method 200 includes submerging a substrate in a solution of 60-80 v. % sulfuric acid and 20-40 v. % hydrogen peroxide based on the total volume of the sulfuric acid and hydrogen peroxide, for at least ten minutes to form a piranha cleaned substrate. In some embodiments, a piranha solution is a 3:1 mixture of concentrated sulfuric acid ($H_2SO_4$) with hydrogen peroxide ($H_2O_2$), used to remove organic residues from substrates. In some embodiments, the substrates were cleaned in a piranha solution ($H_2SO_4:H_2O_2=3:1$) for 10 min and rinsed in DI water.

At step 204, the method 200 includes washing the piranha cleaned substrate with DI water to form a washed substrate.

At step 206, the method 200 includes exposing the washed substrate to ozone for at least 10 minutes to form the first substrate. In some embodiments, samples were treated with ozone for 10 min after drying in $N_2$ to form the first substrate.

Electrochemical properties of the EC-ESD are measured in a three electrode system with the NiO and FTO as the working electrode, and Pt foil and Hg/HgO as the counter and reference electrodes, respectively, placed in a solution of the electrolyte. In some embodiments, the electrochromic energy storage device has an areal capacitance of 100-140 mF/cm², preferably 110-140, or 125-140 mF/cm² at a scan rate of 5-10 mV/s. In some embodiments, at least 90%, preferably 95% or 100% of the areal capacitance is maintained by the device after 1,000 charge-discharge cycles. In some embodiments, the device has a series resistance of 1.5-1.75 ohm (a), preferably 1.5-1.7, or 1.5-1.68Ω, and a charge transfer resistance of 80-90Ω, preferably 82-88, or 85-86Ω. In some embodiments, the device has an optical modulation of 60-72%, preferably 65-70%, or 67-68%, and a coloration efficiency of 45-55 cm²/C, preferably 46-52, or 47-49 cm²/C.

The optical modulation is the difference of the percent of transmitted light at a particular wavelength for the bleach and colored states. The coloration efficiency is the change in optical density per injected charge density at a particular wavelength. In an embodiment, the wavelength is 500-600 nm, preferably 525-575 nm, or 540-560 nm. In some embodiments, the device has a switching response time for coloration of 0.5-1 seconds, preferably 0.5-0.9, or 0.5-0.85 s, and a switching response time for bleaching of 0.1-0.5 seconds, preferably 0.1-0.4, or 0.1-0.3 s.

EXAMPLES

The following examples describe and demonstrate exemplary embodiments of an electrochromic energy storage device as described herein. The examples are provided solely for the purpose of illustration and are not to be construed as limitations of the present disclosure, as many variations thereof are possible without departing from the spirit and scope of the present disclosure.

Example 1: Synthesis of Nickel Oxide (NiO) Nano-Sheets (NSs)

Figure 3:
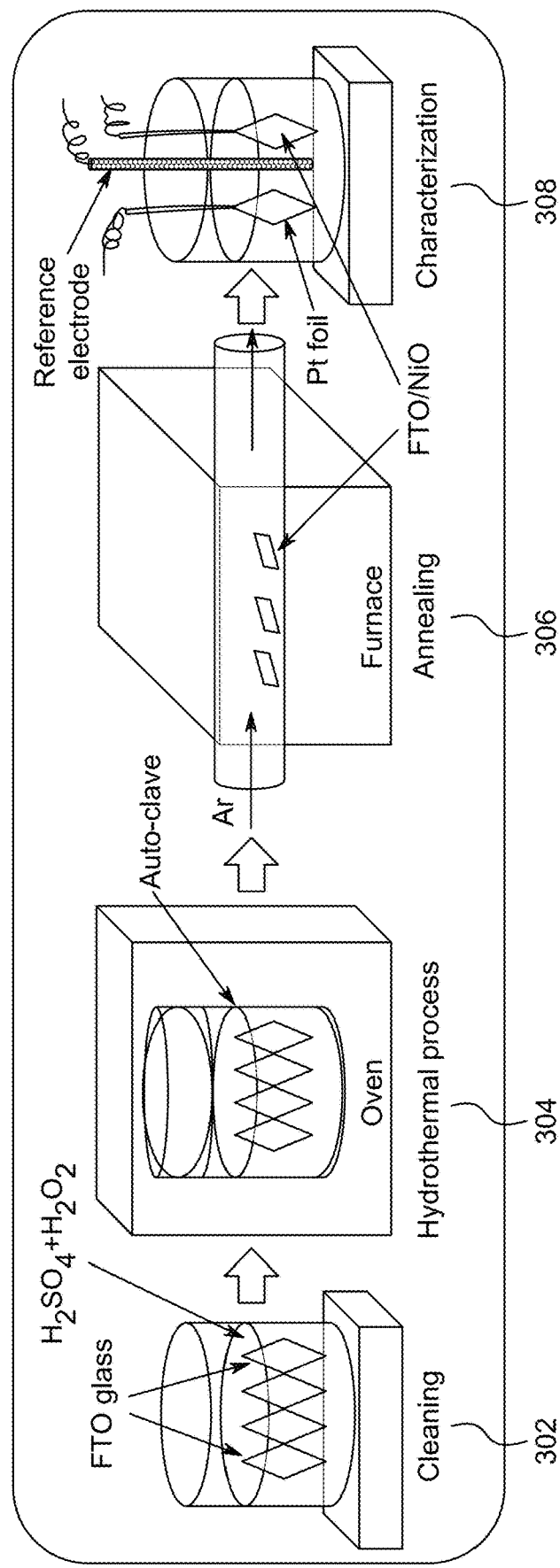
FIG. 3 illustrates a schematic procedure of NiO NSs synthesis, according to certain embodiments.

FIG. 3 is a schematic illustration depicting a procedure of NiO NSs synthesis. At step 302 fluorine-doped tin oxide (FTO) glass substrates (size=2.0×2.5 cm²) were thoroughly cleaned using detergent, followed by rinsing in de-ionized (DI) water. The substrates were further cleaned in piranha solution ($H_2SO_4:H_2O_2$=3:1) for 10 min and rinsed in DI water. After drying in $N_2$, samples were treated with ozone for 10 min. For the precursor preparation of NiO NSs, 87.0 milligrams (mg) of nickel nitrate hexahydrate [$Ni(NO_3)_2 \cdot 6H_2O$], 90.0 mg of urea [$CO(NH_2)_2$], and 22.2 mg of ammonium fluoride ($NH_4F$) were dissolved in 70 milliliters (ml) of DI water to form a homogeneous solution. The homogenous solution was further stirred for 1 hour at 450 revolutions per minute (rpm). A 100 ml Teflon-lined stainless-steel autoclave was used as a reaction chamber to conduct the hydrothermal reaction 304. The solution was shifted into the Teflon reactor. Kapton tape was used to cover 0.5×2.0 cm² area for the electrical contacts (remained active area was 2.0×2.0 cm²). Four pieces of cleaned FTO glasses were vertically placed in the solution, and the autoclave reaction chamber was sealed. At step 304, a hydrothermal reaction was performed at 100 degrees centigrade (° C.) for 5 hours. After the reaction, the tapes were removed, and the samples were washed in DI water followed by natural drying in the air. At step 306, the samples were annealed at 300° C. for 90 min in Ar (argon) ambient. At step 308, the obtained sample was characterized using different instruments. The implicated chemical reaction might be demonstrated in the below equations.

$$Ni(NO_3)_2 + xNH_4F \rightarrow Ni^{2+} + 2NO_3^- + xF^- + xNH^- + xNH_4^+; \quad (1)$$

$$Ni^{2+} + xF^- \rightarrow [NiF_x]^{(x-2)-}; \quad (2)$$

$$H_2NCONH_2 + H_2O \rightarrow 2NH_3 + CO_2; \quad (3)$$

$$CO_2 + H_2O \rightarrow CO_3^{2-} + 2H^+; \quad (4)$$

$$2[NiF_x]^{(x-2)-} + 2CO_3^{2-} + 2OH^- + nH_2O \rightarrow Ni_2(OH)_2 CO_3 \cdot nH_2O + 2xF^-; \quad (5)$$

$$Ni_2(OH)_2CO_3 \cdot nH_2O \rightarrow NiO + (1+n)H_2O + CO_2; \quad (6)$$

Example 2: Material Characterization

XRD characterization was carried out using a diffractometer (Empyrean, PAN analytical, United States of America (USA)). The elemental composition investigation was conducted using X-ray photoelectron spectrometry (XPS: Thermo Scientific, ESCALAB 250Xi). For the XPS measurement, a monochromatic Al Kα X-ray source (1486.6 electron Volt (eV)) was used. The Ni 2p and O 1s peaks were calibrated with the C 1s peak. The surface morphology was studied by Field emission scanning electron microscopy (FE-SEM: Hitachi, S-4800). Nitrogen adsorption measurements were conducted for the NiO samples scratched from the FTO surface to analyze the surface (Tristar-3000, micromeritics). A Brunauer-Emmett-Teller (BET) method was used to calculate the surface area; however, the pore size distribution was determined by Barrett-Joyner-Halenda (BJH) methods. High-resolution transmission electron microscopy (HR-TEM: HF-3300/NB5000/S-4800, Hitachi, Japan) was used to obtain cross-sectional TEM image and energy dispersive spectroscopy (EDS) elemental maps of glass/FTO/NiO structure. FT-IR transmission spectra were acquired by the FT-IR spectroscope (Continuum, Thermo Fisher Scientific, USA). An ultraviolet-visible (UV-Vis) spectrophotometer (SHIMADZUUV-2550) was used to measure the transmittance of the NiO layer during the coloration and bleach. The complete color and bleach states were achieved by applying the potential of +0.75 and −0.20 volt (V), respectively, for 30 seconds (s).

Example 3: Electrochemical and Electrochromic Characterization

The electrochemical characterization was done by a 3-electrode system using a potentiostat (VersaSTAT3, Princeton Applied Research, USA). The FTO/NiO, mercury/mercury oxide (Hg/HgO), and platinum (Pt) foil were used as working electrode, reference electrode, and counter electrodes, respectively. An aqueous solution of 6.0 molar (M) potassium hydroxide (KOH) was used as an electrolyte for EIS, CV, and GCD characterizations. The EIS spectra were acquired in a frequency range of 0.05 Hz to 100 KHz (applied alternating current (A/C) voltage of 5 mV.

The EIS results were studied using Nyquist plots, which include the real (Z') and imaginary (Z") parts of impedance. The CV characterization was done at the scan speed (v) of 5-200 mV/s in 0-0.6 V (vs. Hg/HgO). The GCD measurement was performed in 0-0.5 V (vs. Hg/HgO).

Example 4: Structural and Bonding Analysis

FIG. 4A illustrates the phases information of the NiO NSs 406 as determined by the XRD analysis. The XRD pattern of bare FTO 402 along with unannealed $Ni_2(OH)_2 CO_3 \cdot nH_2O$ layer 404 were also provided for the comparison. Three main peaks with very low intensity were observed at 2θ=37.3°, 43.2°, and 62.8° corresponding to (111), (200), and (220) planes of cubic NiO phase, respectively (JCPDS 4-0835), as can be observed in the trendline 406. These results confirmed the formation of NiO with low crystallinity. It was observed that the fully crystalline NiO layer was unfavorable for the high-performance EC-ESDs. The crystalline size was determined by the Debye-Scherrer relation.

$$D = \frac{0.9\lambda}{\beta Cos\theta}, \quad (7)$$

where β is full width at half maxima (FWHM).

The obtained average crystallite size was ~2.5 nm, which was slightly lower than the crystalline size obtained by the hydrothermal process on indium doped tin oxide (ITO). Furthermore, the bonding analysis of the unannealed layer 452 and annealed layer 454 was done using FT-IR. In the unannealed layer 452, a sharp absorption band was observed at 3636 cm$^{-1}$, co-relating to the hydroxyl group (non-hydrogen bonds ν(OH)) of β-Ni(OH)$_2$ phase. The bands centered at 1627 cm$^{-1}$ and 693 cm$^{-1}$ associated with angular deformation of water molecular and ν(ONi) were also observed in the unannealed samples. After annealing, the sharp absorption peak of ν(OH) was not found; however, another strong band originated at 467 cm$^{-1}$ related to the —O— stretching vibration of NiO. The bands observed at 529 cm$^{-1}$ and 1067 cm$^{-1}$ were related to δ(OH) and ν(NO$_3^-$), respectively. These results also confirmed the formation of the NiO phase after annealing at 300° C., as can be observed in trend line 452.

Example 5: Morphological and Elemental Analysis

Figure 5B:
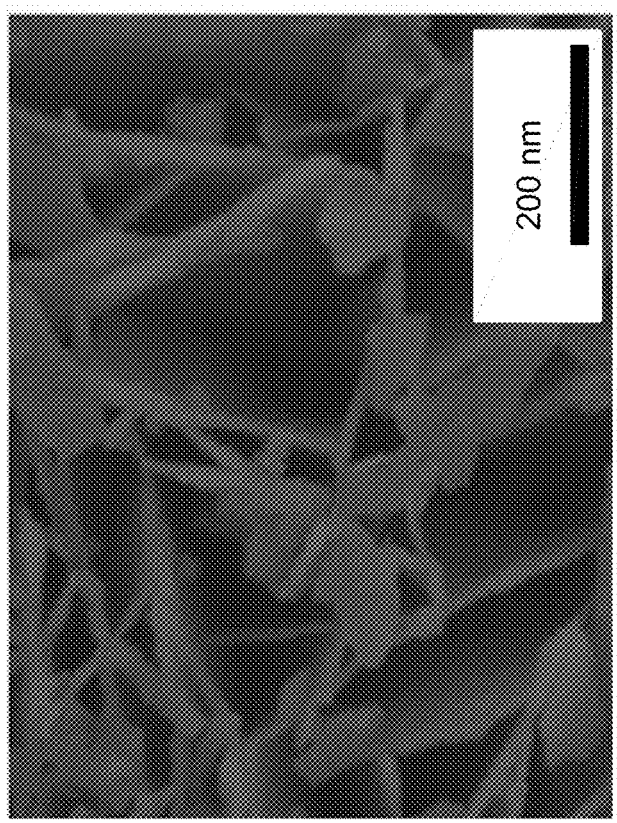
FIGS. 5A-5B illustrate a field emission scanning electron microscopy (FE-SEM) images of NiO NSs grown on the FTO glass, at low resolution and high resolution, respectively, according to certain embodiments.
Figure 5A:
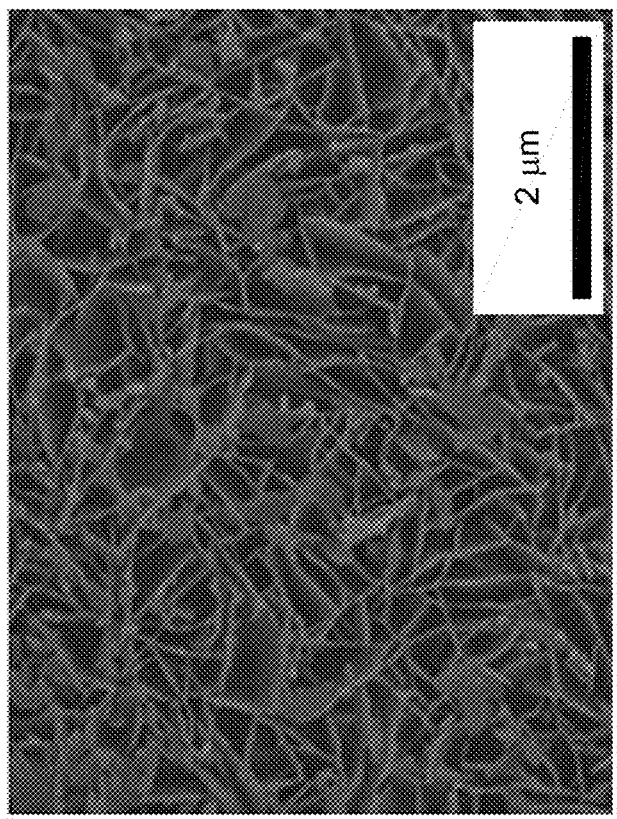
Figure 5C:
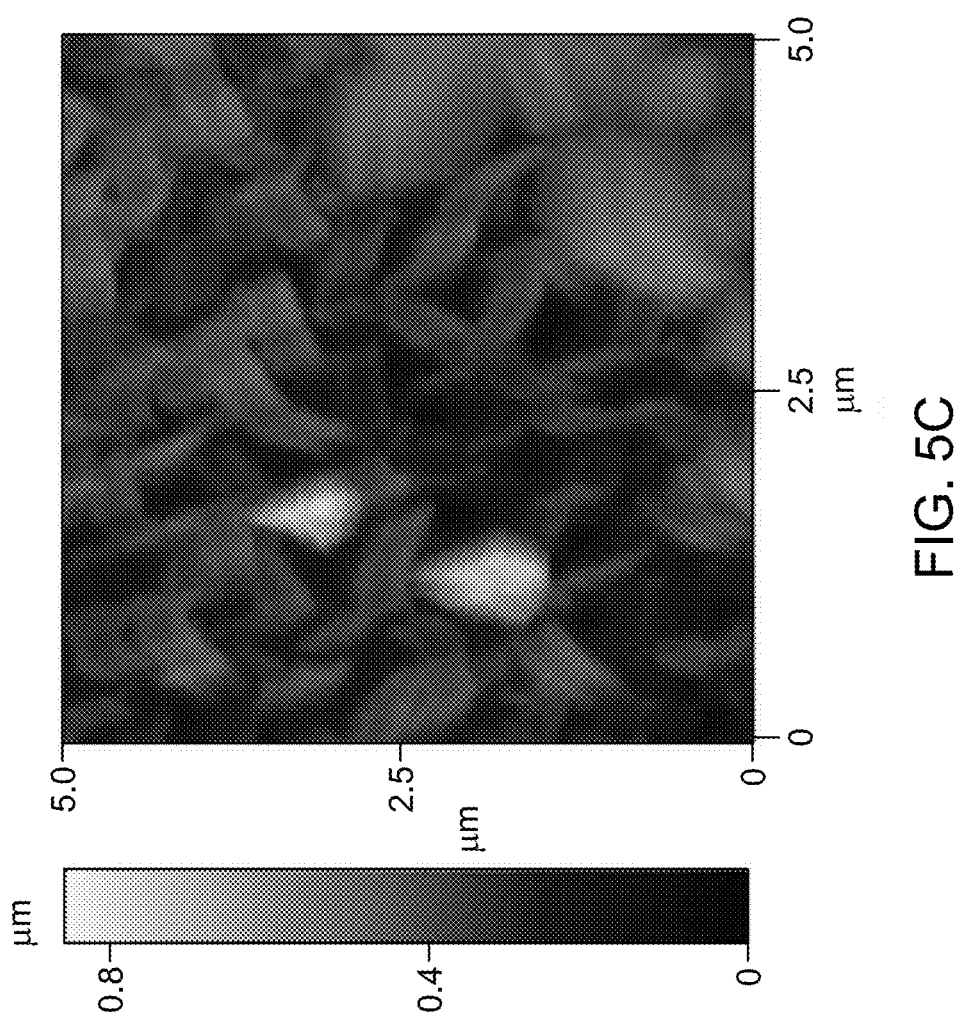
FIG. 5C illustrates an atomic force microscopy (AFM) topographic image of the NiO NSs grown on the FTO glass, according to certain embodiments.
Figure 5D:
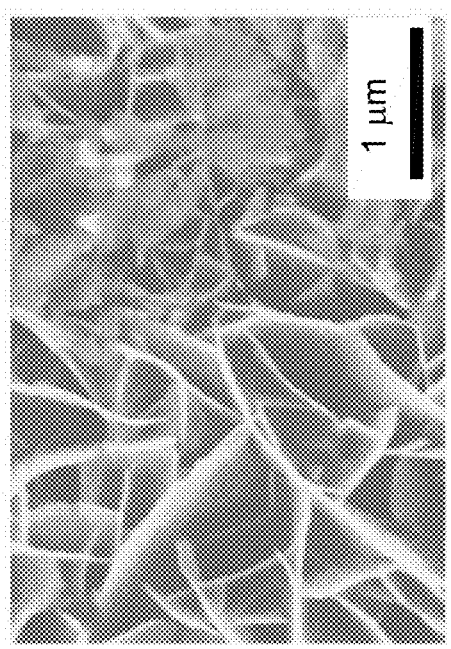
FIGS. 5D-5G illustrate FE-SEM-EDS (energy dispersive spectroscopy) mapping of a NiO nanowires (NWs) layer grown on the FTO, according to certain embodiments.
Figure 5E:
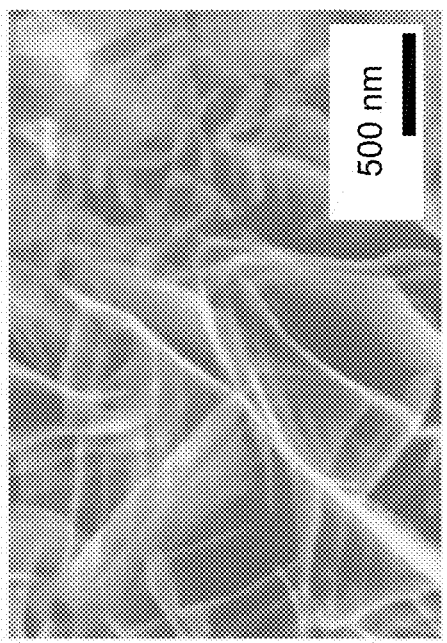
Figure 5F:
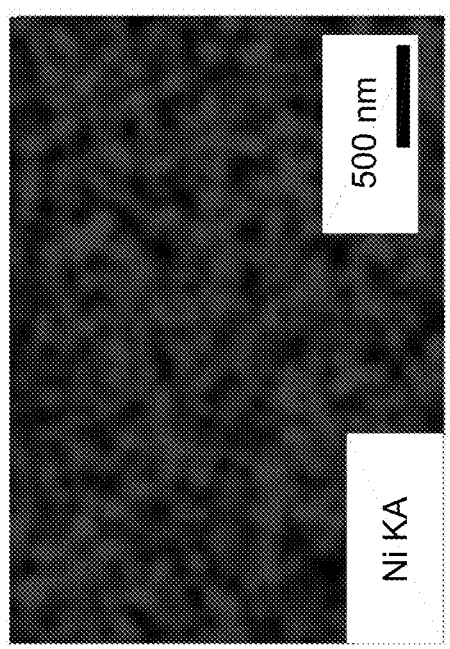
Figure 5G:
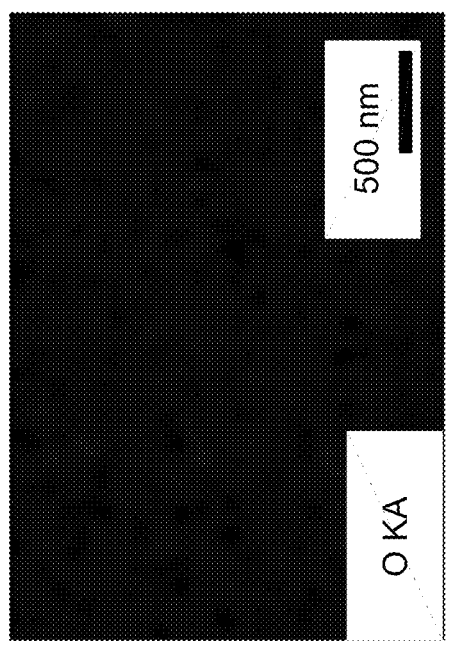

FIGS. 5A-5B illustrate the FE-SEM images of the NiO NSs grown on the FTO glass. The NiO layer contained porous NSs structures, which were constituted of nanoflakes. The width of the nanoflakes was found to be in the range of 10~20 nm. Furthermore, FIG. 5C depicts the atomic force microscopy (AFM) analysis to understand the surface morphology and roughness. From FIG. 5C it is seen that the NiO NSs were well aligned. The obtained surface roughness was ~800 nm, which provided a huge contact area with the electrolyte. Subsequently, the specific capacitance might be improved. The FE-SEM EDS mapping of the NiO nanowires (NWs) layer grown on the FTO was illustrated in FIGS. 5D-5G. The elemental distribution was investigated using EDS mapping. Only Ni and O elements are observed in the NiO layer, which confirmed no impurity or contaminations in the layer. These elements were uniformly distributed over the surface, which reveals that the NiO structure is consistent over the surface.

Figure 6B:
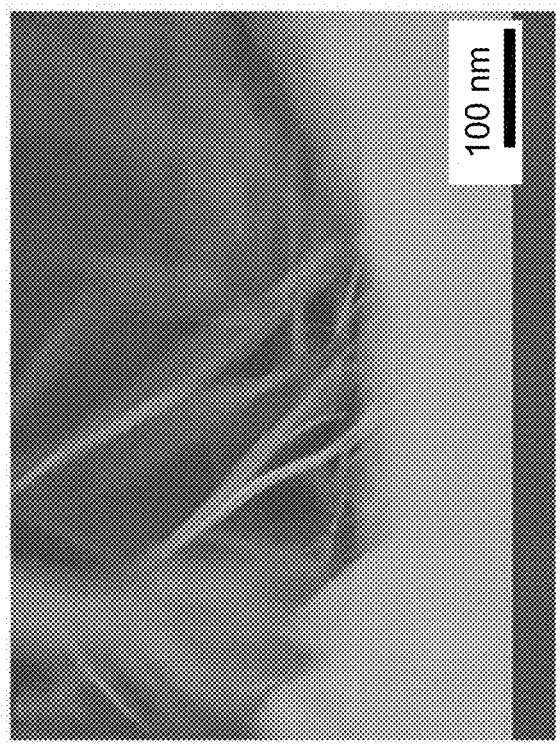
FIGS. 6A-6B illustrate cross-sectional transmission electron microscopes (TEM) images of a glass/FTO/NiO structure, according to certain embodiments.
Figure 6A:
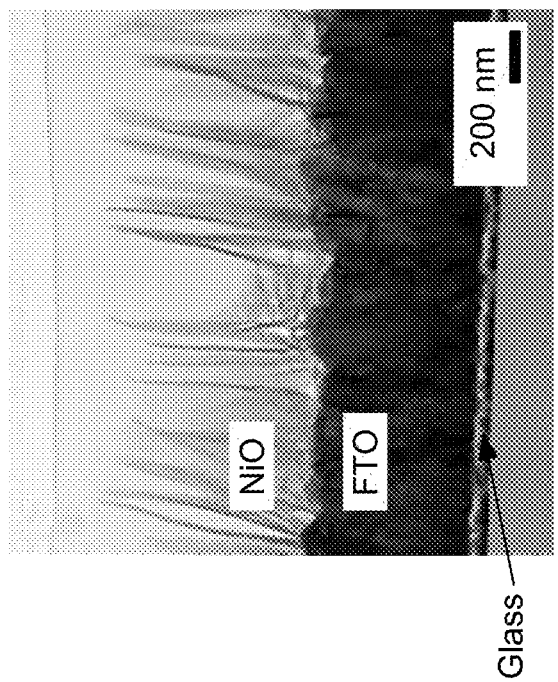
Figure 7A:
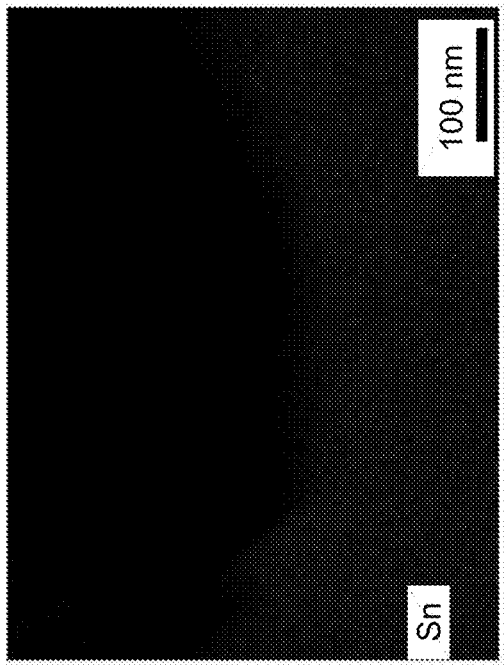
FIGS. 7A-7D illustrate cross-sectional TEM-EDS mapping images of the glass/FTO/NiO structure, according to certain embodiments.
Figure 7B:
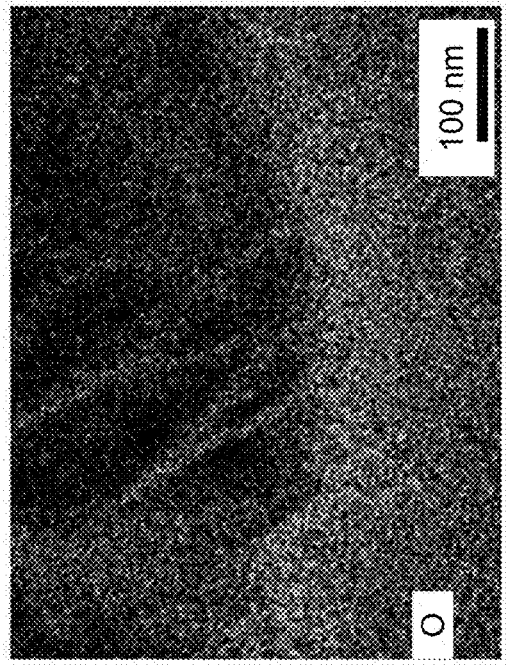
Figure 7C:
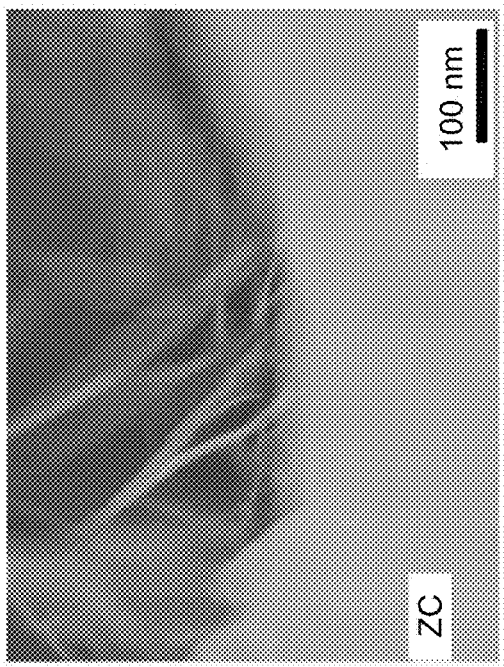
Figure 7D:
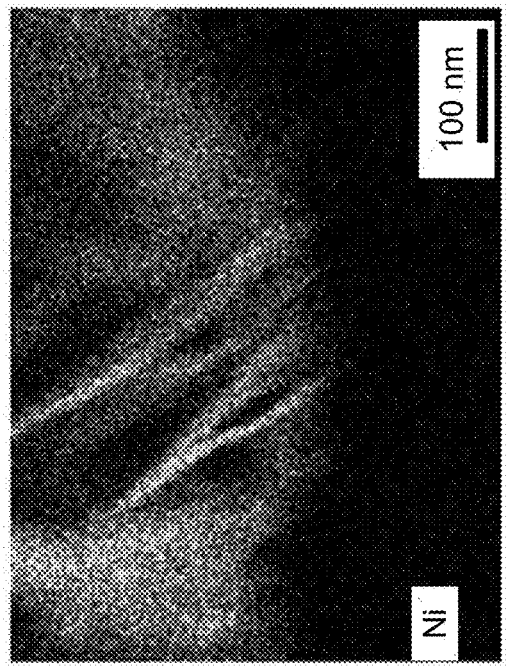

FIG. 6A illustrates the cross-sectional high resolution (HR)-TEM image of the glass/FTO/NiO. FIG. 6B illustrates a magnified image of the FTO/NiO interface. From FIG. 6A a uniform growth of the NiO layer was found to be throughout the entire surface of the FTO. The NiO NSs showed a porous structure as confirmed by the TEM result (FIG. 6B).

FIGS. 7A-7D illustrate a cross-sectional TEM-EDS mapping of the glass/FTO/NiO structure. TEM-EDS was conducted to examine the elemental distribution in the FTO, the NiO layer, and the interface between them. The Ni and O elements were observed in the NiO layer and the FTO, respectively. The O was obtained in both layers and uniformly distributed over the surface of the NiO layer. However, the elemental density at the interface was high due to the formation of the O$^-$ rich interfacial layer, which might enhance charge transportation. Thus, the switching speed can be boosted. In the FTO layer, only Sn was observed.

Figure 8A:
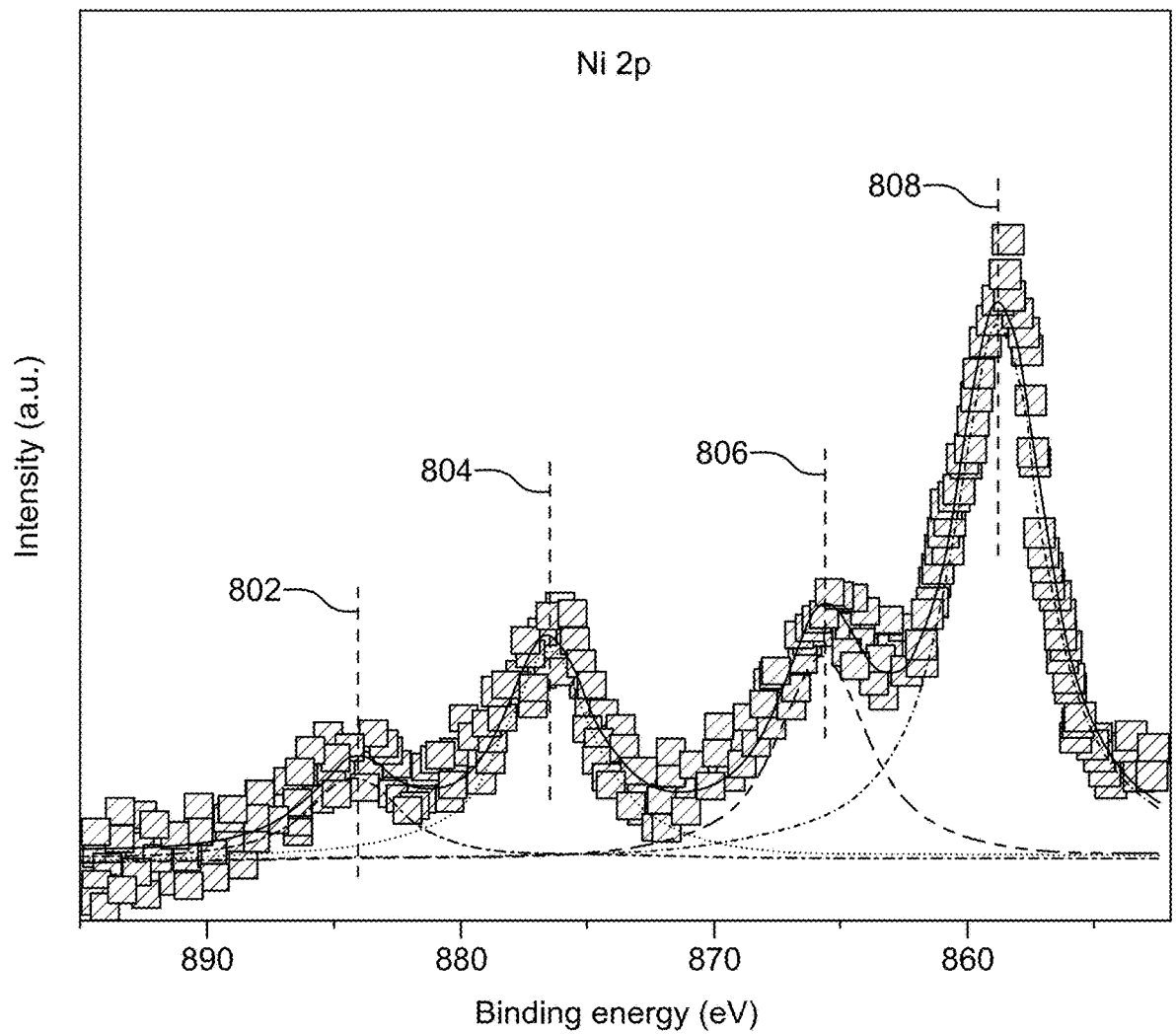
FIG. 8A illustrates a high-resolution X-ray photoelectron (XPS) spectrum of the NiO NSs for Ni 2p scan, according to certain embodiments.
Figure 8B:
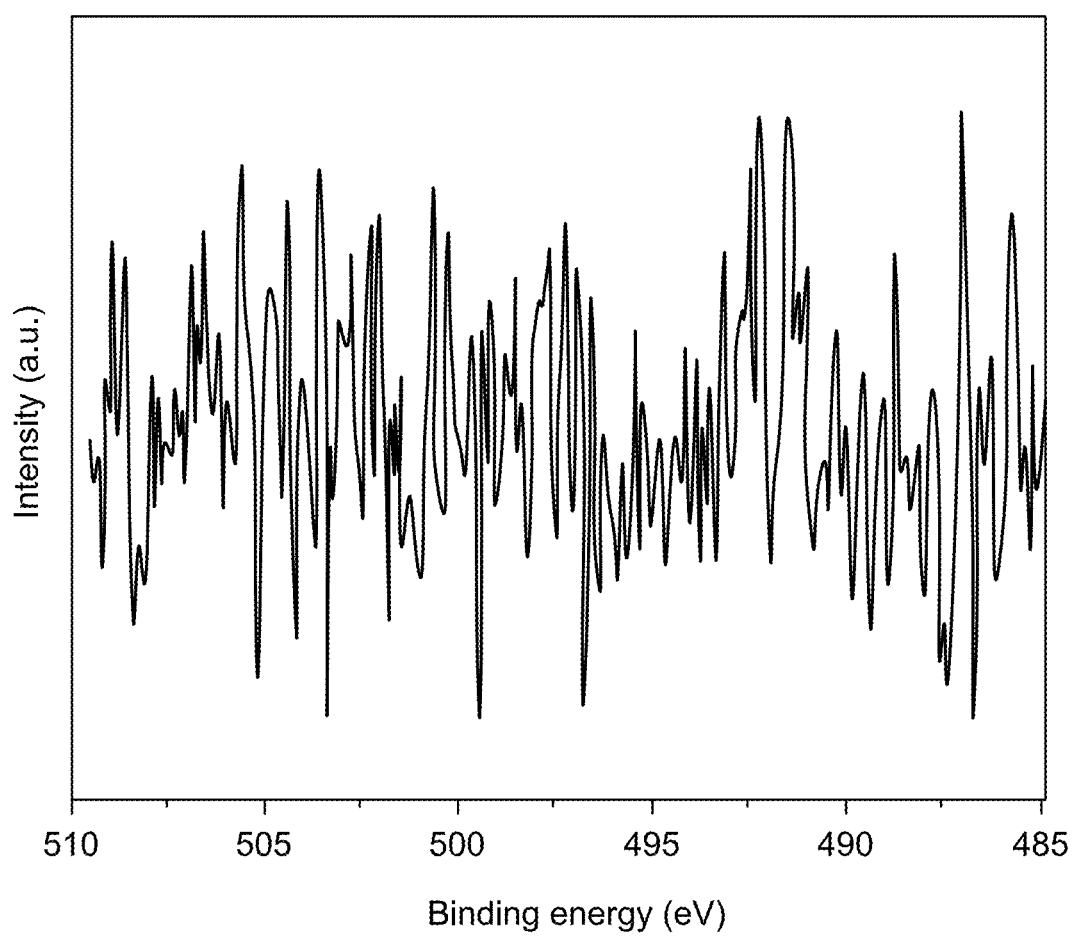
FIG. 8B illustrates the high-resolution XPS spectrum of the NiO NSs for tin (Sn) $3d$ scan, according to certain embodiments.

FIG. 8A illustrates a highly resolved XPS spectrum of Ni 2p spectra of the NiO layer. The Ni 2p spectra is consist of two spin-orbit levels corresponding to Ni 2p$_{3/2}$ and Ni 2p$_{1/2}$. The deconvoluted peak corresponding to Ni 2p$_{3/2}$ (802) was obtained at 858.77 eV along with a shake-up satellite peak (804) at 865.71 eV, revealing the presence of Ni$^{2+}$ cations. Similarly, the deconvoluted peak corresponding to Ni 4$_{1/2}$ (806) was obtained at 876.56 eV 904, and the shake-up satellite peak (808) at 884.21 eV. The energy spacing between Ni 2p$_{3/2}$ (802) and Ni 2P$_{1/2}$ (806) was obtained as 18.10 eV. A similar spacing was obtained for the sputtered NiO film. The obtained spacing was slightly higher than the previously reported value of NiO. This higher spacing might be because of the not fully crystalline phase of NiO. FIG. 8B illustrated the high-resolution XPS spectrum of Sn 2d. No trace of Sn was present in the NiO layer, which confirmed that the FTO layer was covered with the NiO layer.

Example 6: Optical Properties

Figure 9B:
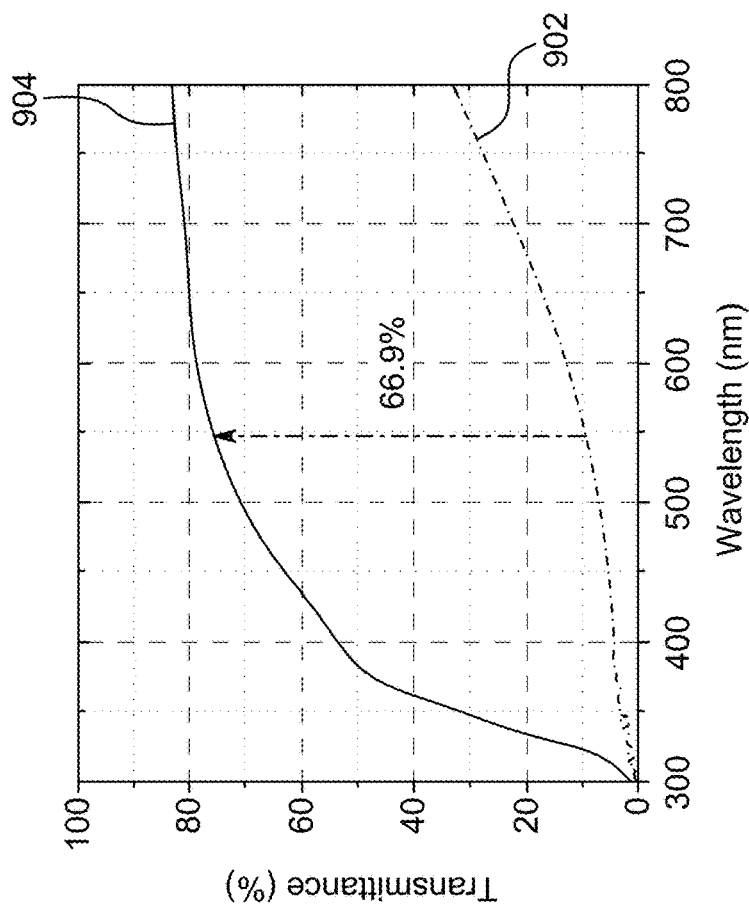
FIG. 9B illustrates a transmittance spectrum for the bleached and colored states of the NiO layer grown on the FTO, according to certain embodiments.
Figure 9A:
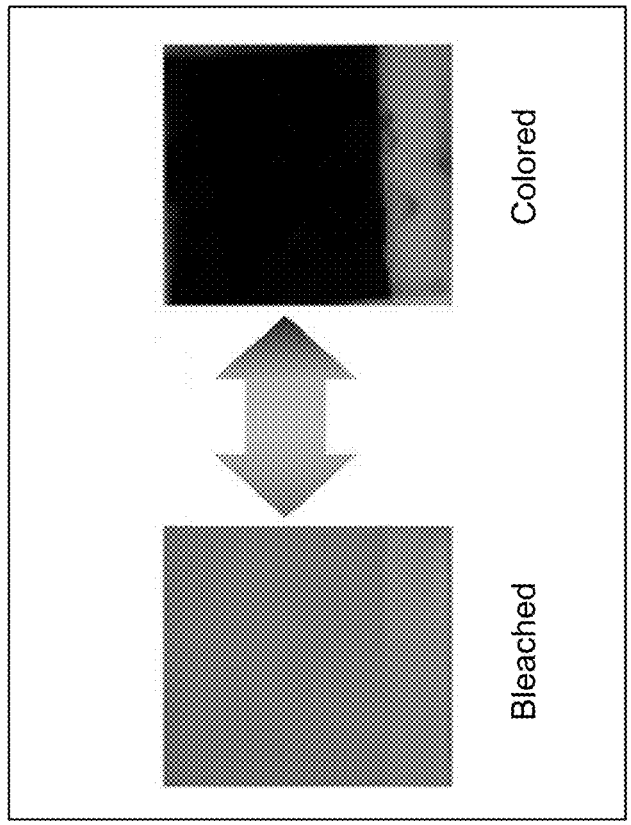
FIG. 9A illustrates an optical image of bleached and colored state of the NiO layer grown on the FTO, according to certain embodiments.

The colored and bleach states were obtained using the potential of +0.75 and −0.20 V, respectively. FIG. 9A illustrated the optical images of the colored and bleached states of the glass/FTO/NiO sample. The sample's color was considerably altered from transparent to dark brown, revealing that the NiO layer exhibits a strong electrochromism. FIG. 9B illustrates the corresponding transmittance spectrum. At the wavelength of λ=550 nm, the transmittance value changed from 76.0% (902) for the bleached state to 9.1% (904) for the colored state; hence achieved transmittance modulation is 66.9%. The change in optical density (ΔOD) was determined using Eq. (8).

$$\Delta OD(\lambda) = \log(T_b/T_c), \quad (8)$$

where $T_b$ and $T_c$ are the transmittance value at bleached and colored states, respectively at a given wavelength. At λ=550 nm, the obtained value of ΔOD is 0.92, which was relatively higher than the ΔOD of the NiO nanoflakes (~0.60 at 632.8 nm).

Example 7: Chronoamperometry (CA) Analysis

Figure 9D:
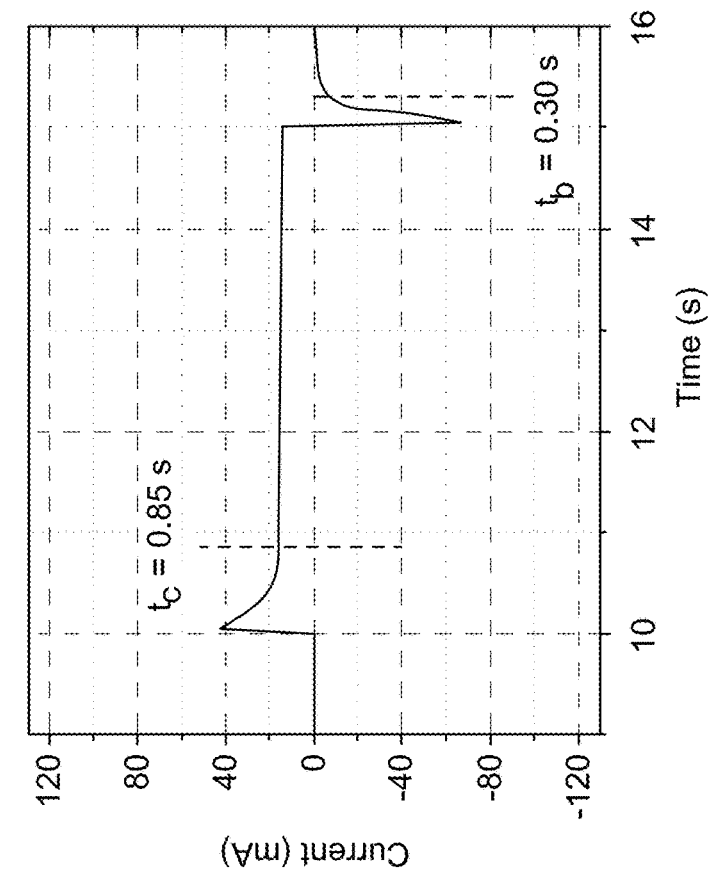
FIG. 9D illustrates a single cycle chronoamperometric profile of the NiO layer grown on the FTO for determining a switching speed of the electrochromic-energy storage device (EC-EDS), according to certain embodiments.
Figure 9C:
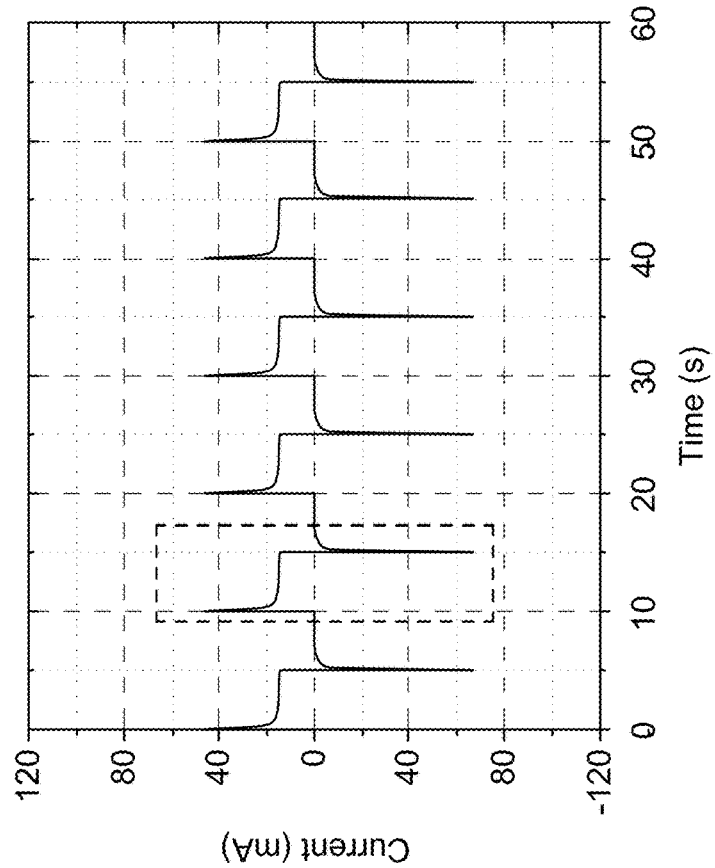
FIG. 9C illustrates a chronoamperometric profile of the NiO layer grown on the FTO for 6 cycles, according to certain embodiments.

The CA measurement was conducted to determine the switching response time of the NiO layer. The switching response time was useful for the EC-ESDs. FIG. 9C illustrates a replicating chronoamperometric response of the EC-ESD electrode via applying a square-waved potential between +0.75 and −0.20 V. The duration of the replicating chronoamperometric response was 5 seconds. FIG. 9D illustrates the switching response time, determined by calculating the total time taken during 90% of full optical modulation or time needed to attend steady-state condition by applying the potential. The switching response times for coloration ($t_c$) and bleaching ($t_b$) were 0.85 and 0.30 s, respectively. The coloration efficiency (change in optical density for unit charge intercalation) was another parameter for EC-ESD electrodes, calculated using Eq. (9).

$$CE(\lambda) = \frac{\Delta OD(\lambda)}{\Delta Q}, \quad (9)$$

where ΔQ is the intercalation charge. The CE value obtained for the NiO NSs was 48.51 cm$^2$/C.

Example 8: Electrochemical Properties

Figure 10A:
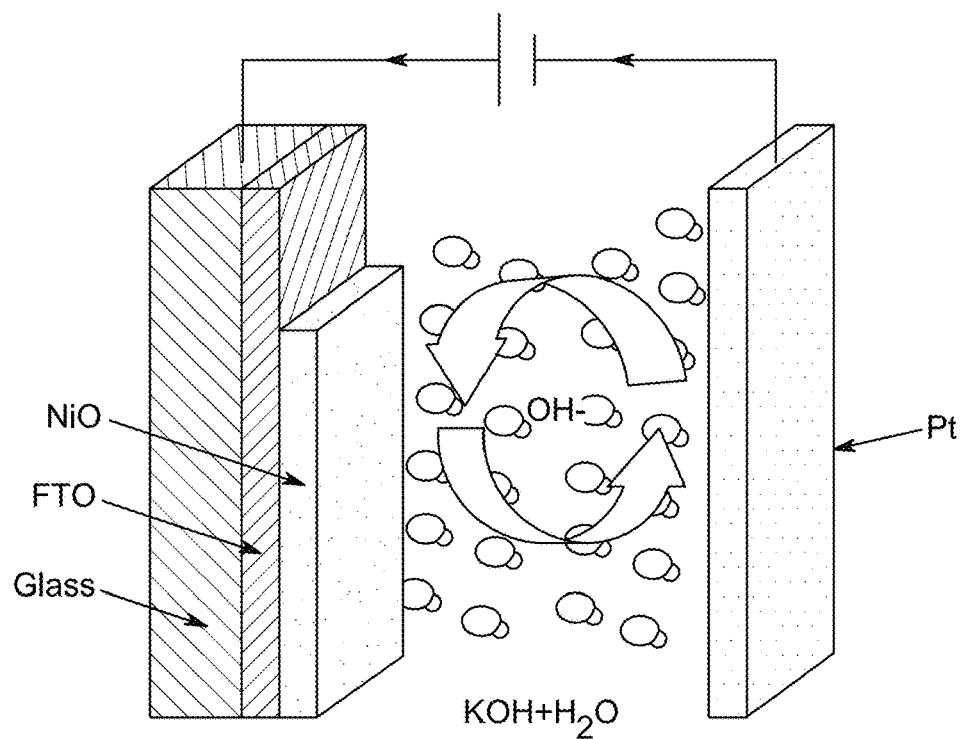
FIG. 10A illustrates an image depicting the architecture of NiO-based EC-ESDs, according to certain embodiments.
Figure 10B:
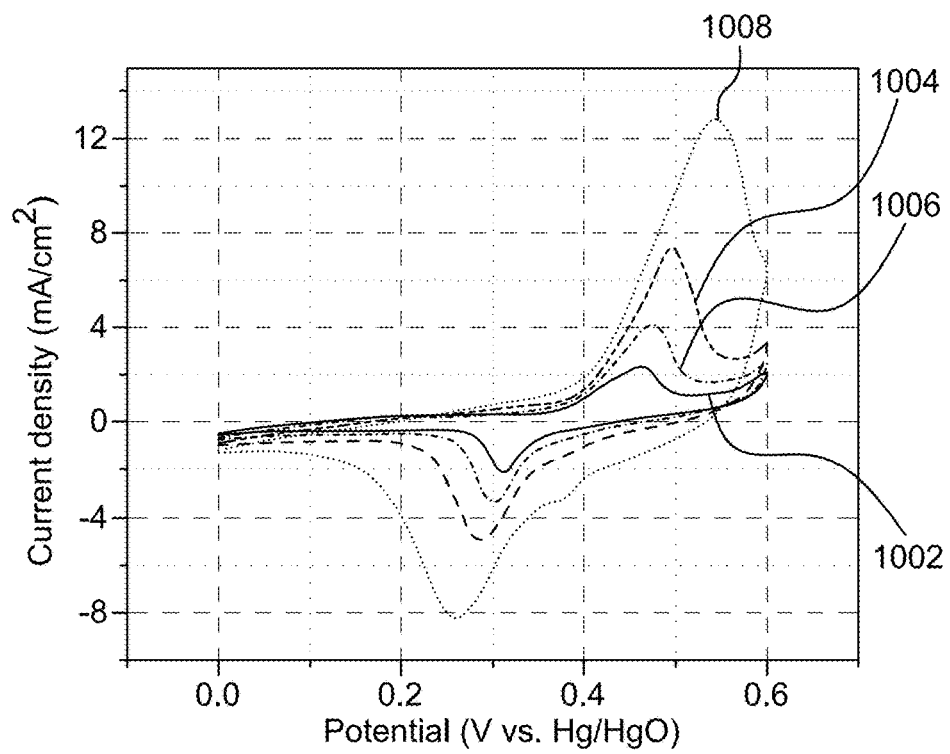
FIG. 10B illustrates cyclic voltammetry (CV) curves of the NiO-based EC-ESDs obtained at various scan speeds (v), according to certain embodiments.
Figure 10C:
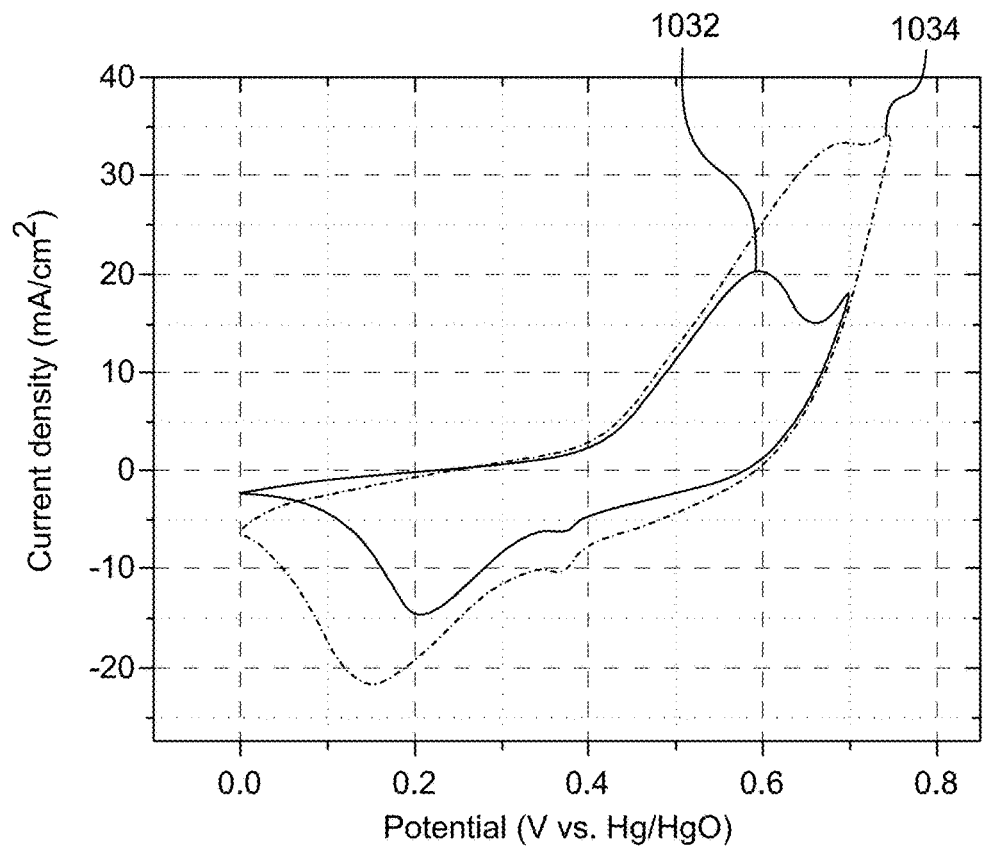
FIG. 10C illustrates CV curves of the NiO NWs layer at a scan rate of 100 and 200 mV/s, according to certain embodiments.

Another utilization of the EC-ESDs was to store the electrochemical energy. Therefore, the electrochemical characterization of the NiO electrode was performed. For the electrochemical characterization, (6.0M) KOH solution was used to explore the stability of the NiO NSs in a highly concentrated KOH solution. Cyclic voltammetry (CV) characterization was accomplished to investigate OFF insertion/extraction in the NiO NSs layer. FIG. 10A illustrates the schematic image depicting the architecture of the NiO-based EC-ESDs device. From FIG. 10A, it may be observed that the NiO NS grown on the FTO sheets serve as the working electrode, and platinum as a counter-electrode. KOH was used as an electrolyte. FIG. 10B depicts the CV characteristics at various frequencies, particularly, at 5 mV/s (1002), 10 mV/s (1004), 20 mV/s (1006), and 50 mV/s (1008), and the CV curves at higher $\nu$, particularly, 100 mV/s (1032), and 200 mV/s (1034) are illustrated in FIG. 10C. The nature of the CV curves revealed the occurrence of the redox reaction in the NiO NSs. The cathodic and anodic peaks were symmetrical shapes for each CV curve. Moreover, the curves showed pseudo capacitor characteristics owing to the Faradic redox reaction between $Ni^{2+}/Ni^{3+}$. The relation (10) provides the information.

$$NiO+OH^- \leftrightarrow NiOOH+e^-. \qquad (10)$$

Although the separation between anodic and cathodic peaks rises with the increase in $\nu$, the form of the CV curves was unaffected. The areal capacitances (Ca) for different $\nu$ are evaluated using the relation (11).

$$C_a = \frac{\int_{V_1}^{V_2} I.dt}{2\nu A(V_2 - V_1)}; \qquad (11)$$

where $\int_{V_1}^{V_2} I.dt$ is a charge, calculated by integration of the CV curve, A is an active area of the electrode (cm²), and ($V_2-V_1$)=potential window (in V).

Figure 10D:
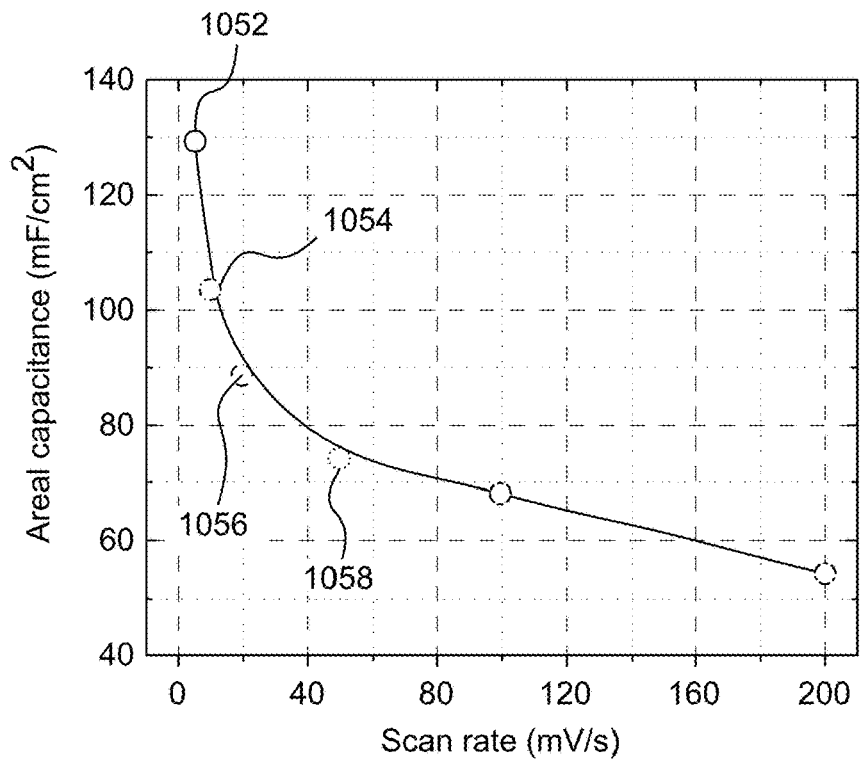
FIG. 10D illustrates a dependency of areal capacity on v, according to certain embodiments.
Figure 10E:
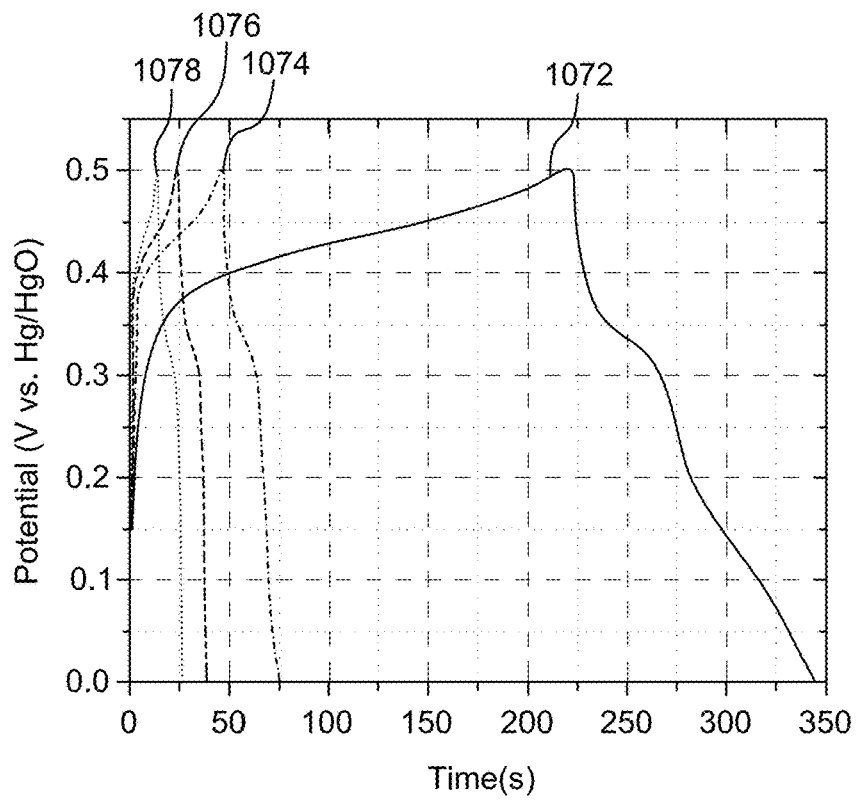
FIG. 10E illustrates a galvanostatic charge-discharge (GCD) profile at various discharge current densities with the NiO-based EC-ESDs, according to certain embodiments.
Figure 10F:
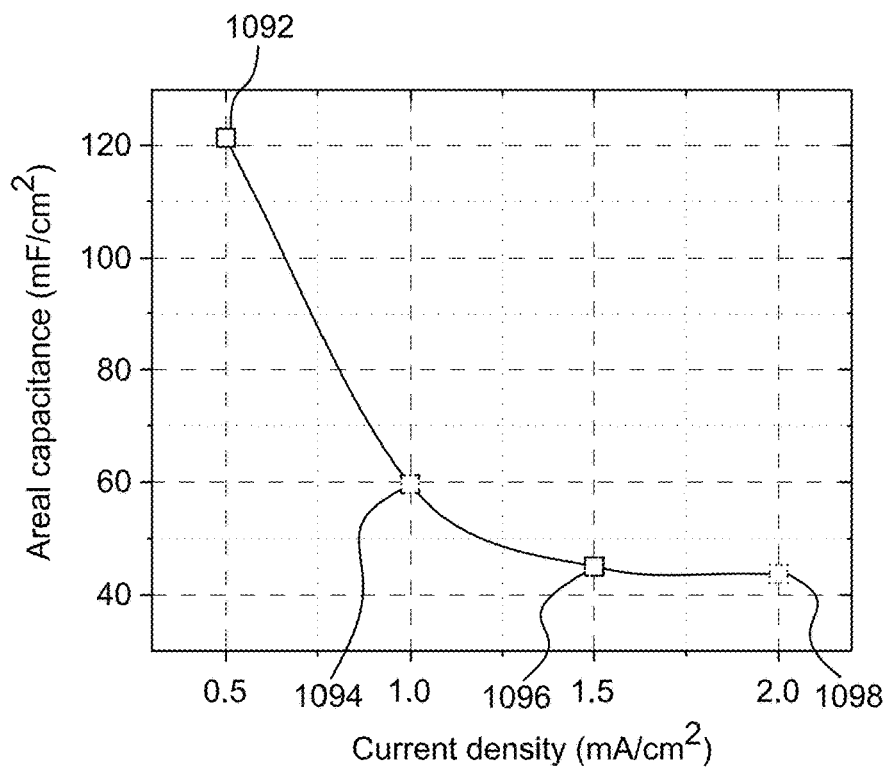
FIG. 10F illustrates a variation of the areal capacity with current density to assess the potential of NiO NSs, according to certain embodiments.
Figure 11A:
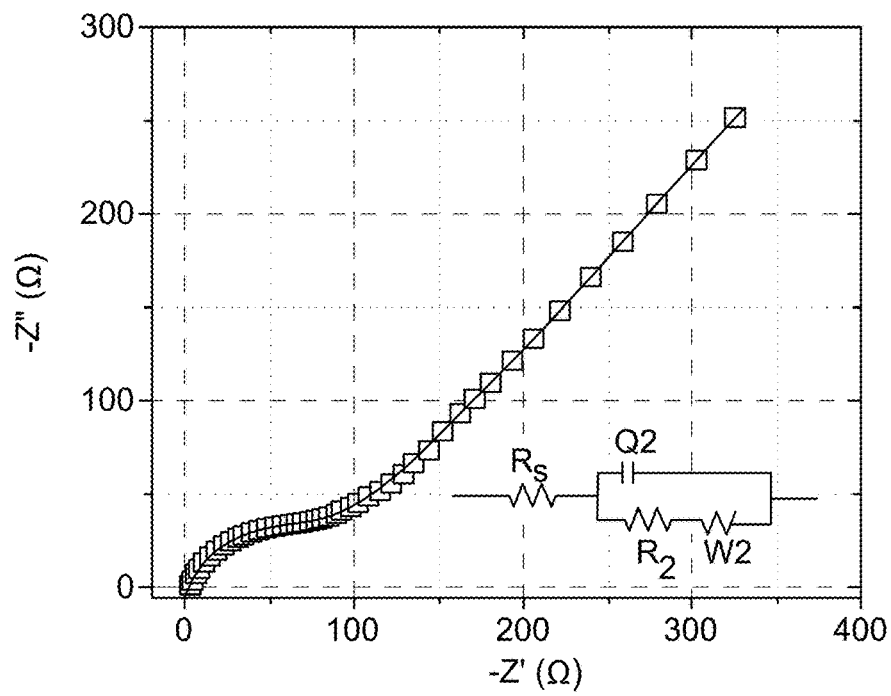
FIG. 11A illustrates an electrochemical impedance (EIS) spectrum (inset equivalent electrical circuit), according to certain embodiments.

The obtained areal capacities are listed in Table 1. FIG. 10D illustrates the dependency of the $C_a$ on $\nu$. The areal capacitance at the $\nu$ of 5 mV/s is 129.32 mF/cm² 1052. Nevertheless, the Ca value at 10 mV/s is 103.44 mF/cm² (1054), which is much higher than the values reported in literature, 72.8 mF/cm² (1058), as can be observed in the trend line shown in FIG. 10D. The areal capacitance value was reduced to 68.44 and 54.58 mF/cm² for the $\nu$ of 100 and 200 mV/s, respectively. FIG. 10E illustrates GCD profile at various discharge current densities to access the potential of NiO NSs. 0.5 potential denoted at various levels were (1072) at 25 s, (1074) at 40 s, (1076) at 75 s, and (1078) at 350 s. The specific capacitance values at various current densities (in mA/cm²) were calculated using Eq. (12).

$$C_{ds} = \frac{I\Delta t}{A(\Delta V')} \qquad (12)$$

Where I was the discharged current (mA), $\Delta t$ is the total discharge time (s), and $\Delta V'$ was the potential drop during discharge. FIG. 10F illustrates the dependency of $C_{ds}$ on current density (J=I/A). The obtained values of $C_{ds}$ are 121.4 (1092), 59.6 (1094), 45.0 (1096), and 44.1 (1098) F/cm² at the J=0.5, 1.0, 1.5, and 2.0 mA/cm², respectively. FIG. 11A illustrated the EIS spectrum on the NiO grown on cleaned FTO. The EIS data was used to determine series resistance ($R_s$) and charge resistance ($R_2$) via fitting the equivalent circuit (inset of FIG. 11A).

TABLE 1

The obtained values of the potential window and areal capacities at different values of $\nu$.

| Scan rate (mV/s) | Potential window (V) | Areal capacitance (mF/cm²) |
|---|---|---|
| 5 | 0.60 | 129.32 |
| 10 | 0.60 | 103.50 |
| 20 | 0.60 | 88.60 |
| 50 | 0.60 | 73.68 |
| 100 | 0.70 | 68.44 |
| 200 | 0.75 | 54.58 |

Figure 11B:
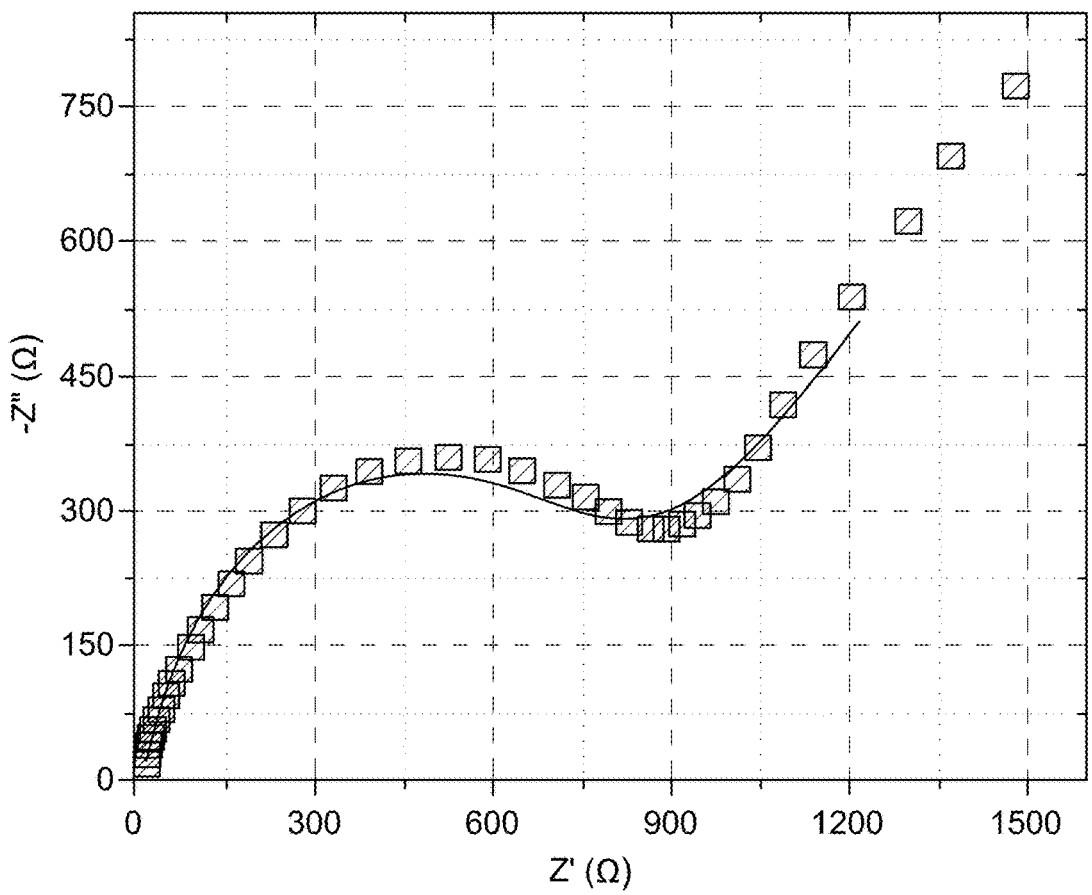
FIG. 11B illustrates an EIS spectrum of the NiO NSs grown on an uncleaned FTO, according to certain embodiments.
Figure 11C:
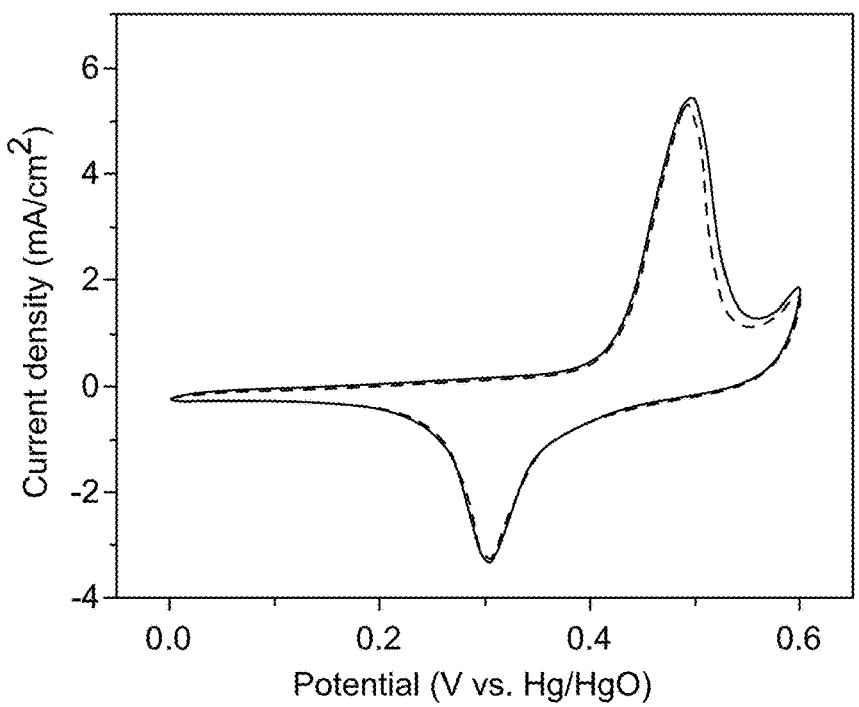
FIG. 11C illustrates the CV curves of 1st and 1000th cycles at v=10 mV/s, according to certain embodiments.
Figure 11D:
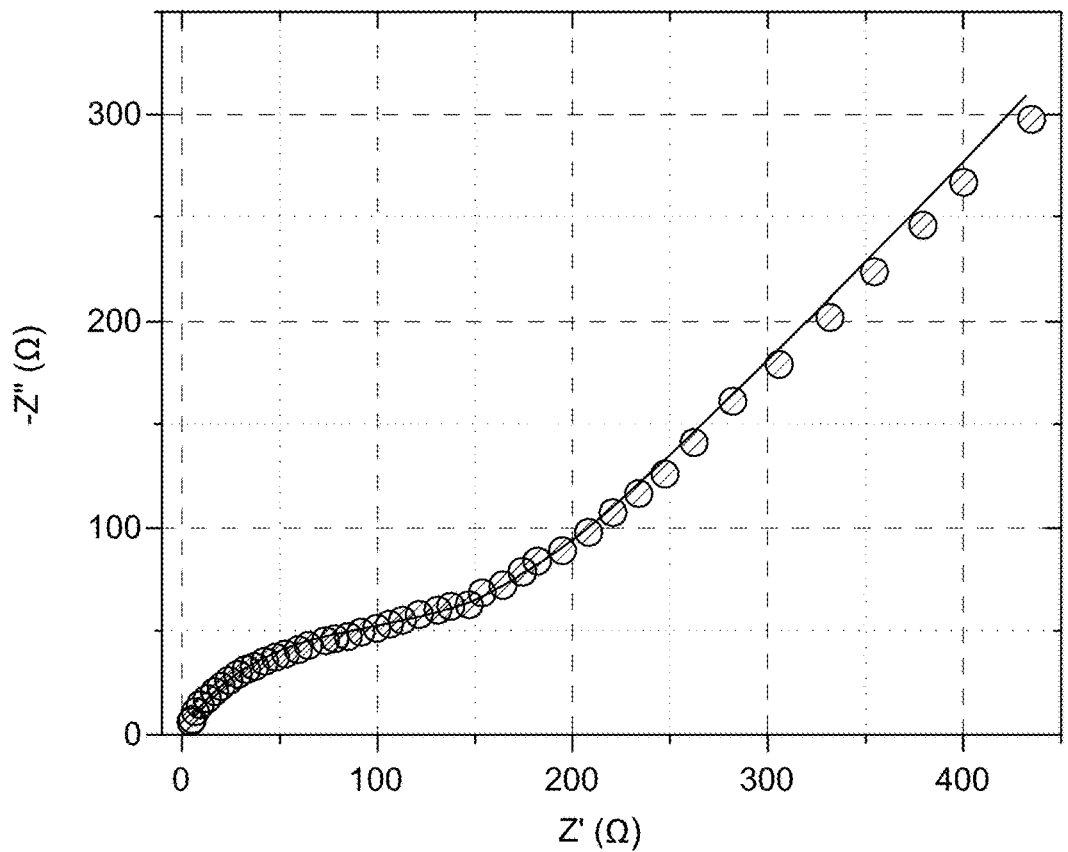
FIG. 11D illustrates the EIS spectra of the NiO NSs after 1000 cycles grown on a cleaned FTO, according to certain embodiments.

The obtained values of $R_s$ and $R_2$ are 1.68 and 85.96Ω, respectively. However, the $R_s$ and $R_2$ values for the NiO grown on uncleaned FTO are significantly higher (FIG. 11B & Table 2). Furthermore, FIG. 11C illustrated the CV curves before and after 1000 cycles. The observed capacity fading is 92.3% after 1000 cycles. After cycling, the values of $R_s$ and $R_2$ increased to 1.72 and 169.10Ω, respectively (FIG. 11D). These results reveal that NiO might be a potential candidate for EC-ESDs.

TABLE 2

The values of $R_s$ and $R_2$ for NiO NSs grown on uncleaned and cleaned FTOs.

| Sample | $R_s$ (Ω) | $R_2$ (Ω) |
|---|---|---|
| NiO on uncleaned FTO | 4.55 | 869.91 |
| NiO on cleaned FTO | 1.68 | 85.96 |
| NiO on cleaned and cycled (1000 c) | 1.72 | 159.12 |

Figure 12A:
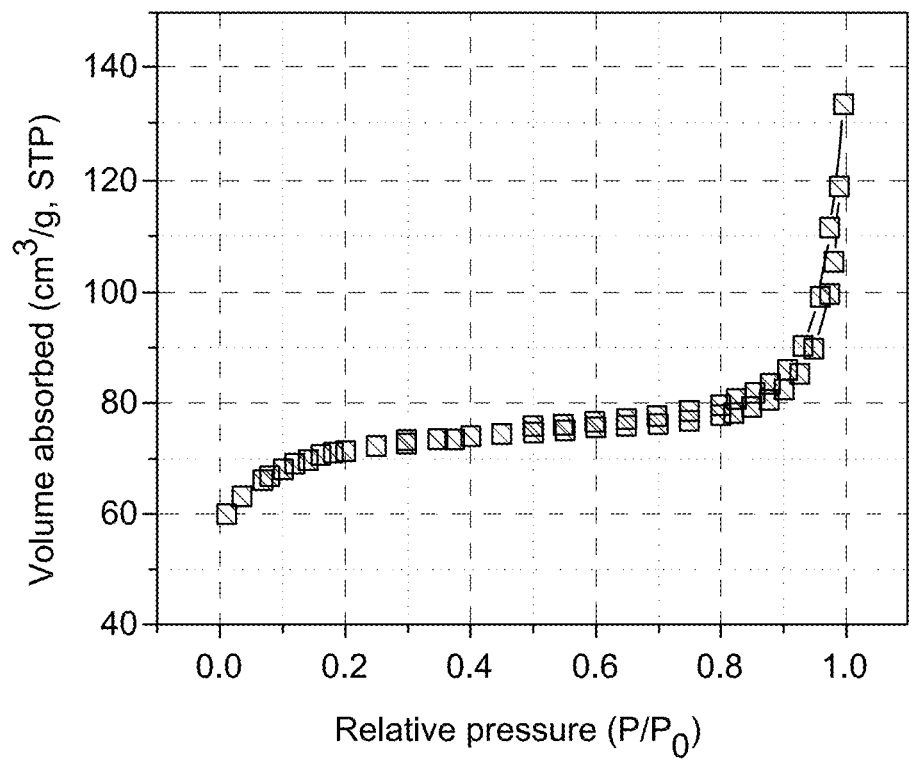
FIG. 12A illustrates nitrogen adsorption-desorption isotherm of the NiO NSs grown on the FTO, according to certain embodiments.
Figure 12B:
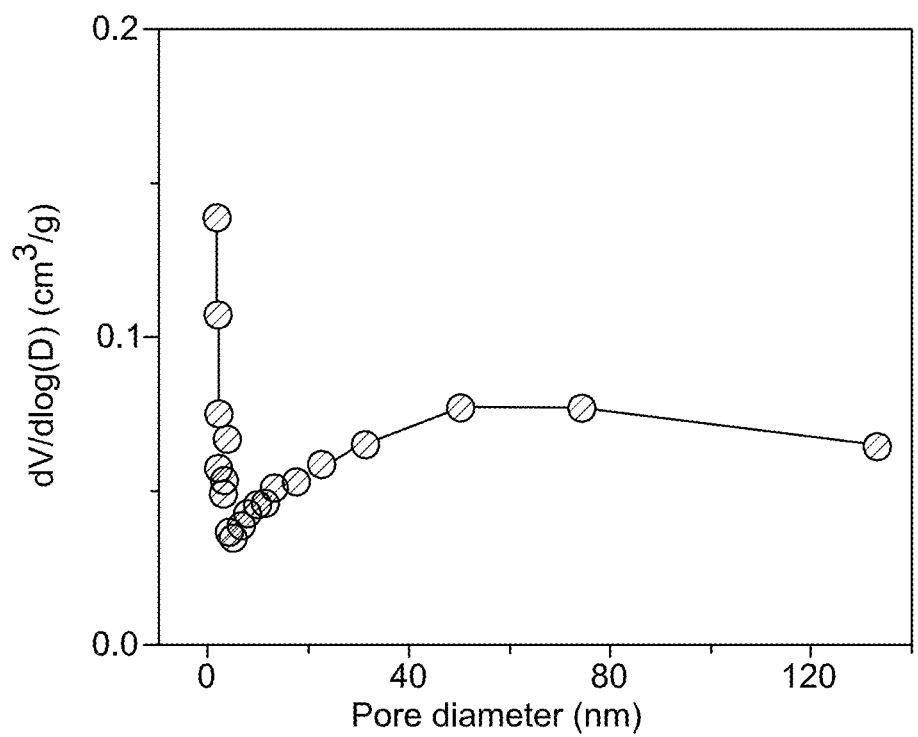
FIG. 12B illustrates a pore size distribution of the NiO NSs grown on the FTO, according to certain embodiments.

Referring to FIGS. 12A-12B, nitrogen adsorption-desorption isotherm along with pore size distribution of the of the NiO grown on uncleaned and cleaned FTOs, is illustrated. The BET surface area and average pore size for the NiO grown on FTOs were 327 m²/g and ~80 nm, respectively.

Highly porous NiO nano-sheets of thickness <20 nm were grown on the hydrophilic surface of FTO glass by a hydrothermal process. The XRD analysis revealed that the crystallite size was ~2.5 nm. A lower value of charge transfer resistance (85.96Ω) was obtained. Thus, the switching speeds of coloration and bleach are considerably lessened to 0.85 and 0.30 s, respectively. Moreover, the obtained optical modulation and CE were 66.9 and 48.51 cm²/C, respectively. The obtained areal capacity values were 129.32, 103.44, 68.44, and 54.58 mF/cm² obtained at $\nu$=5, 10, 100, and 200 mV/s, respectively. Excellent capacity retention (92.3%) was observed at 10 mV/s after 1000 cycles. These results revealed these NiO nano-sheets as a promising electrode material for EC-ESD devices.

Obviously, numerous modifications and variations of the present disclosure are possible in light of the above teachings. It is therefore to be understood that within the scope of the appended claims, the invention may be practiced otherwise than as specifically described herein.

The invention claimed is:
1. An electrochromic energy storage device, comprising:
   a first substrate;
   a second substrate;
   an electrolyte; and
   nickel oxide (NiO) nano-sheets;

wherein the NiO nano-sheets at least partially cover a first side of the first substrate;
wherein the NiO nano-sheets have a porous structure;
wherein the NiO nano-sheets comprise interconnected NiO nanoflakes;
wherein the NiO nanoflakes have a width of 5-29 nm; and
the electrolyte is present between the first substrate and second substrate.

2. The electrochromic energy storage device of claim 1, wherein the NiO nano-sheets have a BET surface area of 300-350 m2/g.

3. The electrochromic energy storage device of claim 1, wherein the NiO nano-sheets have an average pore size of 70-90 nm.

4. The electrochromic energy storage device of claim 1, having an average thickness of 100 to 2,000 nm of the NiO nano-sheets on the first side of the first substrate.

5. The electrochromic energy storage device of claim 1, having a surface roughness of 500-1,000 nm.

6. The electrochromic energy storage device of claim 1, wherein the first substrate is selected from the group consisting of indium tin oxide glass, fluorine-doped tin oxide (FTO) glass, and aluminum-doped zinc oxide glass.

7. The electrochromic energy storage device of claim 1, wherein the second substrate is a metallic foil.

8. The electrochromic energy storage device of claim 1, wherein the electrolyte is selected from the group consisting of an alkali metal hydroxide, an alkaline earth hydroxide, an alkali metal salt, and an alkaline earth salt.

9. The electrochromic energy storage device of claim 1, having an areal capacitance of 100-140 mF/cm$^2$ at a scan rate of 5-10 mV/s.

10. The electrochromic energy storage device of claim 9, wherein at least 90% of the areal capacitance is maintained after 1,000 charge discharge cycles.

11. The electrochromic energy storage device of claim 1, having a series resistance of 1.5-1.75Ω.

12. The electrochromic energy storage device of claim 1, having a charge transfer resistance of 80-90Ω.

13. The electrochromic energy storage device of claim 1, having an optical modulation of 60-72%.

14. The electrochromic energy storage device of claim 1, having a coloration efficiency of 45-55 cm$^2$/C.

15. The electrochromic energy storage device of claim 1, having a switching response time for coloration of 0.5-1 seconds.

16. The electrochromic energy storage device of claim 1, having a switching response time for bleaching of 0.1-0.5 seconds.

17. The electrochromic energy storage device of claim 1, wherein the NiO nano-sheets on the first side of the first substrate are made by a method comprising:
mixing a nickel (II) salt, urea, and a fluoride salt in water and stirring for at least 30 minutes to form a mixture;
at least partially submerging the first substrate in the mixture and heating to 80-120° C. for 2-10 hours to form a NiO substrate;
washing the NiO substrate with water and drying to form a dried substrate; and
heating the dried substrate to 200-400° C. for 1-5 hours under argon to form NiO nano-sheets on the first side of the first substrate.

18. The method of claim 17, further comprising:
submerging a substrate in a solution of 60-80 v % sulfuric acid and 20-40 v % hydrogen peroxide based on the total volume of the sulfuric acid and hydrogen peroxide, for at least ten minutes to form a piranha cleaned substrate;
washing the piranha cleaned substrate with deionized water to form a washed substrate; and
exposing the washed substrate to ozone for at least 10 minutes to form the first substrate.

* * * * *